(12) United States Patent
Austin et al.

(10) Patent No.: US 7,029,586 B2
(45) Date of Patent: *Apr. 18, 2006

(54) INTEGRATED TIDAL WASTEWATER TREATMENT SYSTEM AND METHOD

(75) Inventors: David C. Austin, El Prado, NM (US); Eric Lohan, Taos, NM (US)

(73) Assignee: Dharma Living Systems, Inc., Taos, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/087,089

(22) Filed: Mar. 22, 2005

(65) Prior Publication Data

US 2005/0218071 A1 Oct. 6, 2005

Related U.S. Application Data

(63) Continuation of application No. 10/377,287, filed on Feb. 28, 2003, now Pat. No. 6,881,338.

(51) Int. Cl.
*C02F 3/32* (2006.01)

(52) U.S. Cl. ............... 210/602; 210/622; 210/170; 210/259

(58) Field of Classification Search ............. 210/602, 210/605, 614–617, 620–622, 630, 747, 170, 210/195.1, 252, 259, 903, 908
See application file for complete search history.

(56) References Cited

U.S. PATENT DOCUMENTS

| 681,884 | A | 9/1901 | Monjeau |
|---|---|---|---|
| 2,306,027 | A | 12/1942 | Swaney |
| 2,486,512 | A | 11/1949 | Armstrong |
| 2,822,329 | A | 2/1958 | Griffith |
| 3,385,786 | A | 5/1968 | Klock |
| 3,563,888 | A | 2/1971 | Klock |
| 3,598,726 | A | 8/1971 | Welch |
| 3,768,200 | A | 10/1973 | Klock |
| 3,770,623 | A | 11/1973 | Seidel |
| 3,925,206 | A | 12/1975 | Dea |
| 4,008,159 | A | 2/1977 | Besik |

(Continued)

FOREIGN PATENT DOCUMENTS

DE 1916044 11/1969

(Continued)

OTHER PUBLICATIONS

Solar Aqua Systems, Inc. Marketing brochure, 1978.

(Continued)

*Primary Examiner*—Fred G. Prince
(74) *Attorney, Agent, or Firm*—Allen, Dyer, Doppelt, Milbrath & Gilchrist, P.A.

(57) ABSTRACT

A wastewater treatment system includes a first lagoon having an inlet for receiving wastewater to be treated and a first vertical flow marsh cell having a bottom outlet. Water can be transported from the first lagoon to the first marsh cell. A second lagoon has an inlet for receiving water from the first marsh cell outlet and a second vertical flow marsh cell having a bottom outlet. Water can be transported from the second lagoon to the second marsh cell. At least a portion of the water exiting the second marsh cell outlet can be recycled to the first lagoon. The first and the second lagoon are adapted to function essentially aerobically and to contain plants having roots positioned to contact water flowing thereinto. The first and the second marsh cell are adapted to contain plants having roots positioned to contact water flowing thereinto.

23 Claims, 4 Drawing Sheets

U.S. PATENT DOCUMENTS

| | | |
|---|---|---|
| 4,039,451 A | 8/1977 | Smith |
| 4,057,933 A | 11/1977 | Enyeart |
| 4,169,050 A | 9/1979 | Serfling et al. |
| 4,183,809 A | 1/1980 | Klapwijk et al. |
| 4,267,038 A | 5/1981 | Thompson |
| 4,277,342 A | 7/1981 | Hayes et al. |
| 4,284,508 A | 8/1981 | Jewell |
| 4,331,538 A | 5/1982 | Kickuth |
| 4,333,837 A | 6/1982 | Plósz et al. |
| 4,384,956 A | 5/1983 | Mulder |
| 4,415,450 A | 11/1983 | Wolverton |
| 4,443,337 A | 4/1984 | Otani et al. |
| 4,482,458 A | 11/1984 | Rovel et al. |
| 4,620,931 A | 11/1986 | Hirata et al. |
| 4,678,582 A | 7/1987 | Lavigne |
| 4,735,723 A | 4/1988 | Mulder |
| 4,746,435 A | 5/1988 | Onishi et al. |
| 4,793,929 A | 12/1988 | Kickuth et al. |
| 4,839,051 A | 6/1989 | Higa |
| 4,872,985 A | 10/1989 | Dinges |
| 4,895,645 A | 1/1990 | Zorich, Jr. |
| 4,904,386 A | 2/1990 | Kickuth |
| 4,921,604 A | 5/1990 | Moellenbeck |
| 4,959,084 A | 9/1990 | Wolverton et al. |
| 4,997,568 A | 3/1991 | Vandervelde et al. |
| 5,078,882 A | 1/1992 | Northrop |
| 5,078,884 A | 1/1992 | Mulder |
| 5,087,353 A | 2/1992 | Todd et al. |
| 5,126,050 A | 6/1992 | Irvine et al. |
| 5,137,625 A | 8/1992 | Wolverton |
| 5,174,897 A | 12/1992 | Wengrzynek |
| 5,246,585 A * | 9/1993 | Meiring ................. 75/709 |
| 5,259,959 A | 11/1993 | Mulder |
| 5,337,516 A | 8/1994 | Hondulas |
| 5,389,257 A | 2/1995 | Todd et al. |
| 5,393,426 A | 2/1995 | Raskin et al. |
| 5,486,291 A | 1/1996 | Todd et al. |
| 5,487,829 A | 1/1996 | Safferman et al. |
| 5,518,618 A | 5/1996 | Mulder et al. |
| 5,565,098 A | 10/1996 | Vellinga |
| 5,618,413 A | 4/1997 | Todd et al. |
| 5,626,644 A | 5/1997 | Northrop |
| 5,645,730 A * | 7/1997 | Malachosky et al. ....... 210/665 |
| 5,733,453 A | 3/1998 | DeBusk |
| 5,736,047 A * | 4/1998 | Ngo ........................ 210/602 |
| 5,755,852 A | 5/1998 | Northrop |
| 5,766,474 A | 6/1998 | Smith et al. |
| 5,785,864 A | 7/1998 | Teran et al. |
| 5,788,842 A | 8/1998 | Frisch |
| 5,820,759 A | 10/1998 | Stewart et al. |
| 5,863,433 A | 1/1999 | Behrends |
| 5,863,435 A | 1/1999 | Heijnen et al. |
| 5,876,484 A | 3/1999 | Raskin et al. |
| 5,893,975 A | 4/1999 | Eifert |
| 5,897,777 A | 4/1999 | Zoeller et al. |
| 5,904,850 A | 5/1999 | Vellinga |
| 5,906,745 A | 5/1999 | Eto |
| 5,948,262 A | 9/1999 | Todd et al. |
| 5,951,866 A | 9/1999 | Grove et al. |
| 5,985,149 A | 11/1999 | Raetz et al. |
| 6,045,695 A | 4/2000 | Janssen et al. |
| 6,063,273 A | 5/2000 | Habets et al. |
| 6,086,755 A | 7/2000 | Tepper |
| 6,090,294 A | 7/2000 | Teran et al. |
| 6,126,827 A | 10/2000 | Johnson, Jr. et al. |
| 6,159,371 A | 12/2000 | Dufay |
| 6,171,480 B1 | 1/2001 | Lee et al. |
| 6,183,642 B1 | 2/2001 | Heijnen et al. |
| 6,200,469 B1 | 3/2001 | Wallace |
| 6,217,766 B1 | 4/2001 | Stetter et al. |
| 6,221,652 B1 | 4/2001 | Janssen et al. |
| 6,277,274 B1 | 8/2001 | Coffman |
| 6,383,390 B1 | 5/2002 | Van Loosdrecht et al. |
| 6,398,959 B1 * | 6/2002 | Teran et al. ................ 210/609 |
| 6,406,627 B1 | 6/2002 | Wallace |
| 6,447,681 B1 | 9/2002 | Carlberg et al. |
| 6,447,682 B1 | 9/2002 | Flowers |
| 6,585,886 B1 | 7/2003 | Luehr |
| 6,645,374 B1 | 11/2003 | Cote et al. |
| 6,692,642 B1 | 2/2004 | Josse et al. |
| 6,811,700 B1 * | 11/2004 | Austin et al. ................ 210/602 |
| 6,863,816 B1 * | 3/2005 | Austin et al. ................ 210/602 |
| 6,881,338 B1 * | 4/2005 | Austin et al. ................ 210/602 |
| 2002/0148779 A1 | 10/2002 | Shieh et al. |
| 2002/0185437 A1 | 12/2002 | Haridas et al. |
| 2004/0000517 A1 | 1/2004 | Austin et al. |
| 2005/0126991 A1 * | 6/2005 | Austin et al. ................ 210/602 |

FOREIGN PATENT DOCUMENTS

| | | |
|---|---|---|
| DE | 3941211 | 6/1991 |
| DE | DD 300 015 A7 | 5/1992 |
| DE | 29802903 U1 * | 10/1998 |
| GB | 1 579 623 | 11/1980 |
| GB | 2 182 651 | 5/1987 |
| JP | 58-70891 | 4/1983 |
| JP | 10-15586 | 1/1998 |
| JP | P2000-246283 | 9/2000 |
| KR | 2003086176 | * 11/2003 |
| RU | 2107041 | 3/1998 |
| SU | 1346588 | 10/1987 |
| WO | WO 95/17351 | 6/1995 |
| WO | 02/076893 | 10/2002 |

OTHER PUBLICATIONS

Reed, Sherwood and Bastian, Robert, "Aquaculture Systems for Wastewater Treatment: An Engineering Assessment," U.S. Environmental Protection Agency Office of Water Program Operations Municipal Construction Division, 132 pages Jun. 1980.

Jewell, W. J. et al., "Wastewater Treatment with Plants in Nutrient Films," U.S. Environmental Protection Agency, EPA-600/S2-83-067, pps. 1-5, Oct. 1983.

Jewell, William J., "Anaerobic Sewage Treatment," Environmental Science & Technology, vol. 21, pps. 14-21, Jan. 1987.

Zhu, T. et al., "Phosphorus Sorption and Chemical Characteristics of Lightweight Aggregates (LWA) Potential Filter Media in Treatment Wetlands," Wat. Sci. Tech., vol. 35, No. 5, pps. 103-108, 1997.

Austin, David, "Final Report on The South Burlington, Vermont Advanced Ecologically Engineered System (AEES) for Wastewater Treatment," U.S. Environmental Protection Agency, pps. i-M2, Mar. 4, 2000.

Alleman, James E., "The History of Fixed-Film Wastewater Treatment Systems," pp. 18, retrieved on Jul. 14, 2004. Retrieved from the Internet: <URL:http://bridge.ecn.purdue.edu/~alleman/w3-class/456/article/article-biofilmhistory.html>.

Lazarova, Valentina and Manem, Jacques, "Innovation Biofilm Treatment Technologies for Water and Wastewater Treatment," *Biofilms II: Process Analysis and Applications*, pp. 159-206, 2000.

Sun et al., "Treatment of Agricultural Wastewater in a Combined Tidal Flow-Downflow Reed Bed Systems," Water Science Technology, vol. 40, No. 3, pps. 139-146, 1999.

Rakocy, James E., "Integrating Tilapia Culture with Vegetable Hydroponics in Recirculating Systems," Tilapia Aquaculture in the Americas, vol. 1, pp. 163-184, World Aquaculture Society, Baton Rouge, Louisiana, 1997.

McBride, Graham B. and Tanner, Chris C., "Modelling Biofilm Nitrogen Transformation in Constructed Wetland Mesocosms with Fluctuating Water Levels," Ecological Engineering 14, pp. 93-106, Elsevier Science B. V., 2000.

Nguyen, Long M., "Organic Matter Composition, Microbial Biomass and Microbial Activity in Gravel-Bed Constructed Wetlands Treating Farm Dairy Wastewater," Ecological Engineering 16, pp. 199-221, Elsevier Science B. V., 2000.

Tanner, Chris C. et al., "Effect of Water Level Fluctuation on Nitrogen Removal from Constructed Wetland Mesocosms," Ecological Engineering 12, pp. 67-92, Elsevier Science B. V., 1999.

Von Felde, Katrin and Kunst, Sabine, "N- and Cod-Removal in Vertical-Flow Systems," Water Science Technology, vol. 35, No. 5, pp. 79-85, Permagon Press, Oxford, 1997.

Green, Michal et al., "Investigation of Alternative Method for Nitrification in Constructed Wetlands," Water Science Technology, vol. 35, No. 5, pp. 63-70, Permagon Press, Oxford, 1997.

Laber, Johannes et al., "Two Strategies for Advanced Nitrogen Elimination in Vertical Flow Constructed Wetlands," Water Science Technology, vol. 35, No. 5, pp. 71-77, Permagon Press, Oxford, 1997.

Watson, J.T. and Danzig, A.J., "Pilot-Scale Nitrification Studies Using Vertical-Flow and Shallow Horizontal-Flow Constructed Wetland Cells," Constructed Wetlands for Water Quality Improvement, pp. 301-313, CRC Press, Inc., 1993.

Swoboda-Colberg, Norbert et al., "Constructed Vertical Flow Aerated Wetlands," U.S. Department of Commerce Final Report, pp. 1-54, Dec. 1994.

* cited by examiner

INTEGRATED TIDAL WASTEWATER TREATMENT SYSTEM AND METHOD

CROSS-REFERENCE TO RELATED APPLICATION

This application is a continuation of and claims priority to application Ser. No. 10/377,287, filed Feb. 28, 2003 now U.S. Pat. No. 6,881,338, entitled "Integrated Tidal Wastewater Treatment System and Method."

BACKGROUND OF THE INVENTION

1. Field of the Invention

The present invention relates generally to wastewater treatment systems and methods, and, more particularly, to such systems and methods using bioremediation techniques.

2. Related Art

Engineered wetlands for wastewater treatment have been under development since the work of Kathe Seidel in the 1950s. Three basic hydraulic configurations in treatment wetlands are known: surface flow (SF), subsurface horizontal flow (SSHF), and vertical flow (VF). Of these, SF and SSHF wetlands are believed the most common.[1] Even though an early wastewater treatment wetland design by Seidel utilized vertical flow,[2] design criteria are still considered experimental for vertical flow wetlands. Design criteria for VF wetlands are absent from recently published design texts that have extensive expositions of surface flow and horizontal subsurface flow wetland designs.

In the wetland treatment design literature, surface flow wetlands are typically presented as having two significant design shortcomings. The first shortcoming is that surface flow wetlands cannot typically achieve the low $BOD_5$, ammonia, and total suspended solids (TSS) effluent concentrations required for advanced tertiary treatment. The other shortcoming is that surface flow treatment wetlands can serve as sites for breeding disease vectors and nuisance pests. Therefore, surface flow wetlands are typically restricted to applications not requiring advanced tertiary treatment by or sites where vector control is not a critical concern.

Subsurface horizontal flow wetlands tend to provide better $BOD_5$ and TSS treatment than SF wetlands. Despite this advantage, both $BOD_5$ and TSS effluent values from SSHF wetland cannot reliably be expected to meet tertiary treatment standards. Nitrification in SSHF wetlands is typically poor. An advantage of SSHF wetland design is that with no exposed water surface there is no place for disease vectors to breed, but in practice this advantage is often not realized because of surfacing and ponding of wastewater resulting from clogging of wetland media.[1]

Surfacing and ponding of wastewater in SSHF wetlands is believed to be an inherent design weakness. Interstices in gravel media eventually fill with organic and inorganic substances carried in or generated from the wetland influent.[3] Channeling then occurs within the wetland media, degrading treatment. Horizontal flow path velocities are insufficient to carry inorganic fines and recalcitrant organic materials through the media to the wetland outlet. Media in the wetland inlet zone then clogs, forcing wastewater to the surface. Although wastewater will eventually submerge again into the media downstream, some ponding is unavoidable in this situation, and disease vectors can then breed in the ponded wastewater.

The role of plants in SF and SSHF wetlands is substantially different. In SF wetlands plants are rooted in a soil substrate. The stalks and leaves of plants contact the wastewater, not the roots. Stalks and leaves accumulate into a thick thatch cover. It is believed that the plant thatch surface area contributes significantly to the treatment of wastewater. In SSHF wetlands water flows through the gravel media in which the plants are rooted. Theoretically, the contact of wastewater with plant roots plays a significant role in treatment.

There is growing evidence that plants do not play a significant treatment role in SSHF wetlands. Results from studies comparing vegetated and unvegetated subsurface flow wetland treatment systems indicate that plants do not significantly impact treatment,[1,4] even though there is strong evidence that the presence of roots in SSHF wetlands significantly affects the composition of microbial populations.[5] Findings of little or no contribution to treatment from plant roots in SSHF wetlands appear to arise from the relationship between roots and media, and the growth characteristics of roots. The treatment effect of roots is likely to be poorly distinguished from that of media if the media surface area is very large compared with that of plant roots. Moreover, one of the inventors (D. A.) has observed that, in horizontal subsurface flow wetlands, roots tend to grow little below the permanently wetted media surface, creating only a shallow zone of root penetration. The greater hydraulic resistance created by the plant roots reduces wastewater flow in this zone. A dead zone frequently results, owing to the deposition of organic material and the lack of circulation and re-aeration in the root zone.[1]

The potential treatment role of roots cannot be determined if there is minimal root contact with wastewater. Surface-loaded, vertical-flow wetlands[4] theoretically avoid the root-zone flow problems of horizontal subsurface flow wetlands because surface loading forces flow through the root zone. Distinguishing between the treatment effects of media and roots may still be difficult, however. Root zone architecture may also be a confounding factor because of plant species variations and changes occurring during plant maturation. Species-specific root architecture may affect treatment directly[7] and indirectly by altering media porosity[1,8] and thus altering wetland hydraulics.

The basic hydraulic flow path for VF wetlands is for wastewater to be introduced at the wetland surface, pass through media and plant roots, then to flow out of the wetland via an underdrain system. Designs vary considerably in how wastewater is distributed on the wetland surface, in media composition and configuration, duration of flooding if used, depth of flooding, and recycle if used.

Most work with VF wetlands has been done in Europe, where European vertical flow wetland designs commonly employ fine, sharp sand at the surface, underlaid with a coarser media.[9] Plants root in the fine sand, and the low hydraulic conductivity of the fine sand forces a temporary free water surface. Slow percolation through the sand layer is thought to aid treatment. After completely draining, the previously flooded VF wetland cell is allowed to rest for a period, usually a few days, to permit reaeration of the sand layer. Without reaeration the sand in the interstices would eventually clog with accumulated wastewater constituents and biomass growing on wastewater nutrients.[10]

The European VF wetland design began with the work of Kathe Seidel[11]; however, the design development advances are still relatively new because interest in vertical flow wetland design for wastewater treatment only began to capture the interest of wetland designers in the 1990s.[11] A similar design for dewatering and composting biosolids in sand filters planted with Phragmites reeds has been in use since the 1960s.[12]

European VF wetland designs appear to provide superior $BOD_5$ removal, nitrification, and total nitrogen removal than SF and SSHF wetlands, but removal of TSS may be better in SSHF wetlands.[11] Some treatment wetlands are designed in combination, employing a VF wetland for nutrient removal, then followed by a SSHF wetland for TSS removal.[11] Vertically loaded wetlands in series have been investigated as well, indicating treatment advantages to this approach.[4,13]

Vertical flow wetlands are often designed to have a period of filling followed by a period of draining. When filled by wastewater, bacterial metabolism within the media depletes dissolved oxygen, producing anoxic or anaerobic conditions. As water drains, air is drawn down into wetland media.[13] Draining is important to permit aeration of wetland media. Fill and drain vertical fluctuation of water levels in vertical flow wetlands is therefore periodic. Drain and fill cycles with a period of approximately a day or less are termed tidal flow.[13] Previously known tidal flow systems are characterized by poor denitrification performance, with the exception of a reciprocating tidal flow system as taught by Behrends.

In the United States, designs have been produced on European models.[14] The Tennessee Valley Authority has disclosed a reciprocating wetland design (U.S. Pat. No. 5,863,433) that appears to achieve advanced tertiary treatment. In this system forward flow passes through series of paired VF wetland cells, with wastewater pumped back and forth between the paired cells several times a day. Such a reciprocating action confers treatment advantages. Each drop of wastewater on average is subjected to multiple passes through wetland media and plants in the reciprocating flow. Because the pumping action drains each cell several times per day, wetland biofilms reaerate with the same frequency. As the water level drops, atmospheric oxygen is pulled into the media bed in a process of hydrodynamic air pumping. Reaeration of biofilms in the wetland media occurs very rapidly, in about 30 seconds on exposure to the atmosphere.

Other vertical flow wetland designs include an upflow VF wetland design in Australia (Australian Pat. No. 461902), which not appear to consistently achieve advance tertiary effluent quality with wastewater effluent. Other researchers have experimented with single-pass downflow VF wetland wastewater treatment systems,[15] and combined downflow and upflow VF wetland systems for surface water remediation.[16]

Lagoon wastewater treatment systems comprise large basins in which wastewater is retained for many days or weeks. Depending upon organic mass loading and design, lagoons may be anaerobic, aerobic, or facultative. A facultative lagoon has an upper layer that is aerobic and a lower layer that is anaerobic. Typically cyanobacteria or algae dominate such lagoons. Aerobic and anaerobic cycling may be diurnal in nature, depending upon photosynthesis and wind-induced mixing.

The advantage of lagoons is their low capital and operating costs. However, lagoons demand large land footprints, owing to the long residence times; in addition, they are not capable of achieving advanced treatment, typically reaching secondary treatment standards at best. Algal growth in lagoons often creates effluent TSS concentrations that are much higher in BOD and TSS than secondary treatment standards would permit, and the filtration of algae from lagoon effluent is difficult.

SUMMARY OF THE INVENTION

The present invention provides a system and method for treating wastewater, for example, municipal, agricultural, and industrial wastewater, to a predetermined level of purity. Another type of water that can be treated with the present invention includes storm water runoff from agricultural, suburban, and urban development.

The present invention comprises an integrated tidal vertical flow marsh (TVFM) treatment system and associated methods. In a particular embodiment the predetermined treatment level may comprise advanced secondary standards, which are defined as $BOD_5 \leq 20$ mg/L, $TSS \leq 20$ mg/L, and $NH_3 \leq 5$ mg/L. Storm water is generally considered as weak wastewater, and herein the term wastewater is intended to include storm water runoff.

A particular embodiment of a wastewater treatment system according to the present invention, not intended to be limiting, can include a first lagoon that has an inlet for receiving wastewater to be treated and a first vertical flow marsh cell that has an outlet adjacent a bottom thereof. A first means for transporting water from the first lagoon to a surface of the first marsh cell is provided.

The system can also include a second lagoon that has an inlet for receiving water from the first marsh cell outlet and a second vertical flow marsh cell that has an outlet adjacent a bottom thereof. A second means for transporting water from the second lagoon to a surface of the second marsh cell is provided.

Means for recycling at least a portion of the water exiting the second marsh cell outlet to the first lagoon can also be provided.

Throughout the subsequent discussion, the definitions of lagoon and marsh cell will be generally taken as follows: The first and the second lagoon are adapted to function essentially aerobically and to contain plants having roots positioned to contact water flowing thereinto. The first and the second marsh cell are adapted to contain plants having roots positioned to contact water flowing thereinto.

The integrated TVFM treatment system of the present invention in a particular embodiment includes alternating marsh cells and lagoons. The overall hydraulic regime in this system preferably involves fill and drain cycles wherein wastewater is alternately pumped between cells and lagoons. The vertical flux of water in and out of the marsh cells is designed to cycle over a predetermined period, and is therefore referred to as tidal.

Inventive concepts involved in the integrated TVFM treatment system design include hydraulic and process aspects, each of which is believed to contain novel elements. Hydraulic design in various embodiments integrates passive forward flow, tidal flow, and recycle flow into one system. It is believed that no such integration exists in the prior art. The process design in various embodiments integrates wetland and lagoon treatment technology in an inventive way that represents an improvement over the existing state of the art in lagoon, wetland, and combined lagoon/wetland wastewater treatment systems. The process design of the present invention also includes elements of environmental and ecological engineering design that significantly improve the state of the art of wastewater treatment in general, and wetland wastewater treatment in particular.

A particular embodiment of a method of the present invention, not intended to be limiting, can include the steps of subjecting wastewater to be treated to a first substantially aerobic environment containing aquatic invertebrates for a first time period and transporting water from the first aerobic environment to a surface of a first substantially aerobic/anoxic environment containing aquatic invertebrates and plants having roots for a second time period.

Water emerging from beneath the plant roots of the first aerobic/anoxic environment is next transported to a second substantially aerobic environment containing aquatic invertebrates for a third time period. Water from the second aerobic environment is then transported to a surface of a second substantially aerobic/anoxic environment containing aquatic invertebrates and plants having roots for a fourth time period.

At least a portion of the water emerging from beneath the plant roots of the second aerobic/anoxic environment is then recycled to the first aerobic environment.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
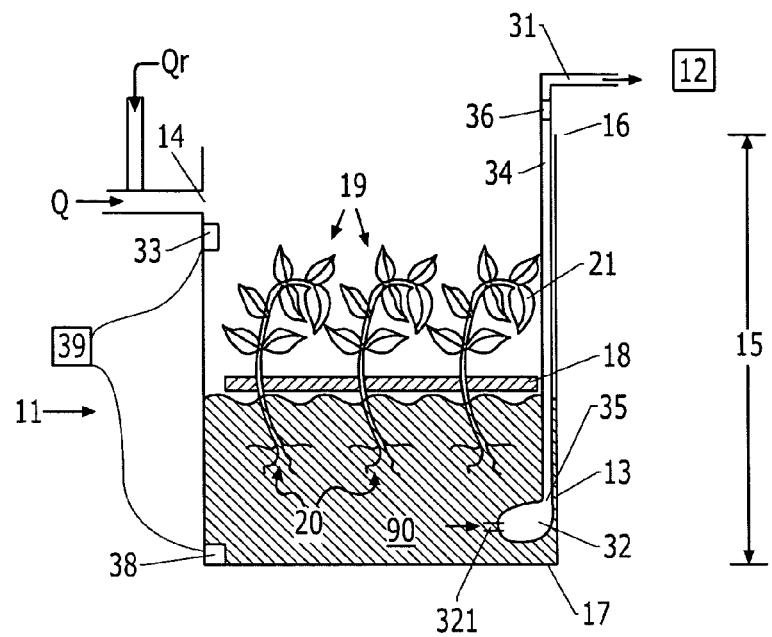
FIG. 1 is a cross-sectional view of an exemplary lagoon of the present invention.

A description of the preferred embodiments of the present invention will now be presented with reference to FIGS. 1–6.

The integrated TVFM treatment system 10 in a particular embodiment comprises an alternating series of lagoons 11 and VF marsh cells 12. Each lagoon 11 (FIG. 1) comprises a basin 13 that has an inlet 14 for receiving wastewater to be treated and an outlet 321 from which treated wastewater exits. The basin 13 has a depth 15 extending from a top 16 to a bottom 17. The lagoon 11 comprises a rack 18 that can float upon a surface of the water 90 in the basin 13, the rack 18 adapted to support wetland plants 19 thereon so that the plant's roots 20 extend beneath the rack 18 and the leaves and stalks 21 extend above the rack 18.

Each lagoon 11 is adapted to maintain a population of grazing aquatic invertebrates, such as, for example, filter-feeding zooplankton.

Each marsh cell 12 (FIG. 2) in a particular embodiment comprises a basin 22 that has a hole, and preferably a plurality of holes 23 in a bottom 24 thereof. The holes 23 thus serve as the marsh cell's outlet. A drain collection trough 25 is positioned beneath the holes 23 for collecting water exiting therefrom. The marsh cell 12 has a depth 26 that is less than that 15 of the lagoon 11. However, the volume of the lagoon 11 is preferably substantially smaller than that of the marsh cell 12.

The basin 22 is adapted to hold a particulate medium therein, such as an aggregate 27 preferably having a diameter no smaller than approximately 2 mm. The aggregate 27 can comprise, for example, a high-porosity plastic medium and/or expanded shale. In a particular embodiment, the depth 271 of media 27 in the basin 22 is no greater than approximately 4 feet. The media 27 is for rooting plants 29 therein.

A mat 28 that is adapted for permitting plants 29 to root 291 therein is positionable above the particulate medium 27 and in spaced relation from a top 30 of the basin 22.

A means for distributing water from a lagoon 11 across a surface of a respective downstream basin 12 is also provided. Such a water distributing means may comprise, for example, low-head distribution piping 31 such as, but not intended to be limited to, an irrigation pipe and an open channel distributor.

The marsh cell 12 is adapted to maintain a population of aquatic invertebrates, such as, but not intended to be limited to, detritivores.

Figure 3:
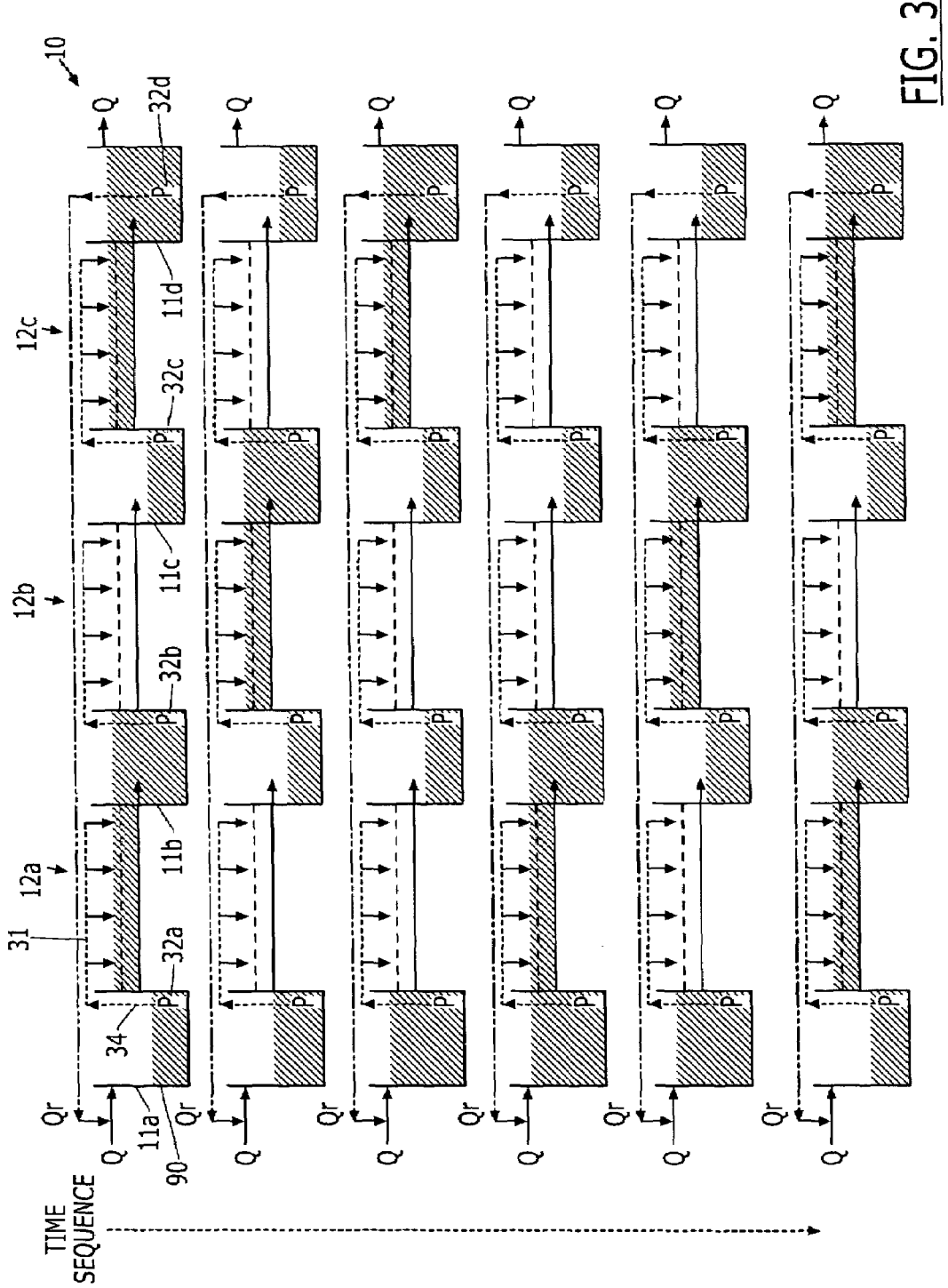
FIG. 3 is a schematic diagram of an exemplary time sequence of water flow between portions of the system of the present invention.

The system 10 preferably comprises a plurality of marsh cells 12a–12c and lagoons 11a–11d, alternating as shown in FIG. 3. Q represents forward flow; $Q_r$, recycle flow. The overflow piping between marsh cells 12a–12c and lagoons 11a–11d is not depicted. The dashed horizontal line in the marsh cells 12a–12c represents the media/plant root surface. The overall hydraulic regime in the system 10 involves fill and drain cycles where wastewater is alternately pumped and flows between cells 12 and lagoons 11. The vertical flux of water in and out of the marsh cells 12a–12c is designed to cycle over a predetermined period of, for example, at least once per day, and is therefore referred to as tidal.

Means for transporting water between the lagoons 11a–11c and marsh cells 12a–12c alternately are provided, as well as recycling between the fourth lagoon 11d and the first lagoon 11a. These may comprise, for example, pump stations 32a–32d associated with each lagoon 11a–11d (FIG. 3). Generally water flows from the marsh cells 12a–12c into their respective lagoons 11b–11d passively, as will be discussed in the following. The water levels in FIG. 3 illustrate how pumping in lagoons on either side of a marsh cell can operate to substantially completely drain the marsh cell, as in, for example, marsh cell 12b in the third step in the illustrated time sequence.

In some embodiments, a pump station alone may be used without an associated lagoon 11. Such a pump station may be positioned, for example, following the last marsh cell, and may comprise a terminal basin having a pump positioned therein. Basin 11d may serve such a function, for example, and may not comprise a lagoon in this embodiment.

In the embodiment shown in FIG. 1, for example, the pump 32 in the lagoon 11 has an intake 321 positioned lower in the lagoon basin 13 than the lagoon inlet 14. A level sensor 33 may be employed in certain embodiments for activating the pump 32 when a level of water in the lagoon 11 reaches a predetermined depth, for example, to prevent flooding.

In a particular embodiment (FIG. 3), the recycling pump 32d is adapted to recycle a water portion in a range of 50–1000% of the wastewater volume entering the first lagoon 1a per unit time. Recycle ratios will be discussed further in the following.

Figure 2:
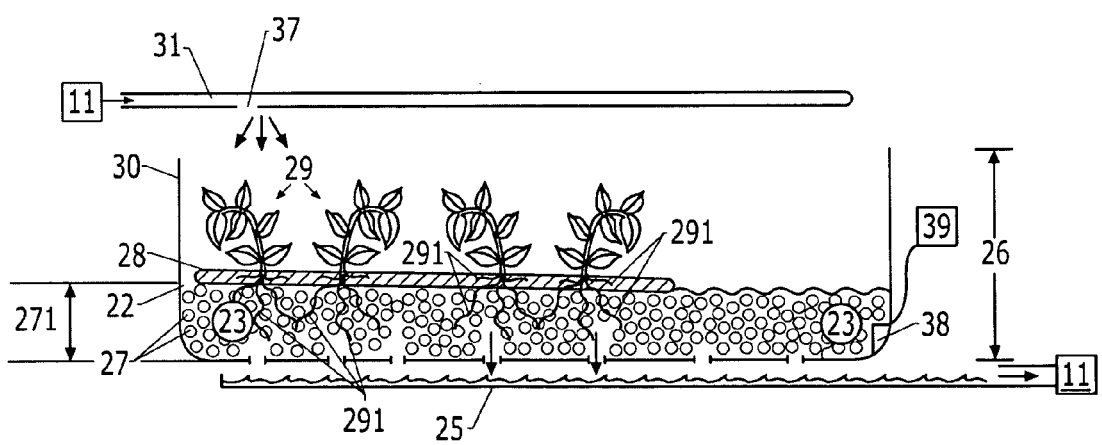
FIG. 2 is a cross-sectional view of an exemplary marsh cell of the present invention.

Piping 34 is also provided for connecting a pump discharge 35 with its downstream marsh cell 12. In a particular embodiment a check valve 36 can be positioned in the pipe 34 for permitting flow toward the marsh cell 12, and for preventing return flow. The piping 34 is in fluid communication with the distribution pipe 31, which has a hole 37 for delivering the water exiting the upstream lagoon 11 to the surface of the marsh cell 12 (FIG. 2).

A sensor 38 may also be provided for sensing a selected chemical parameter of the water in at least one lagoon 11 and a marsh cell 12. The sensor 38 can be in signal communication with a controller 39 to control activation of the pumps 32.

Figure 5:
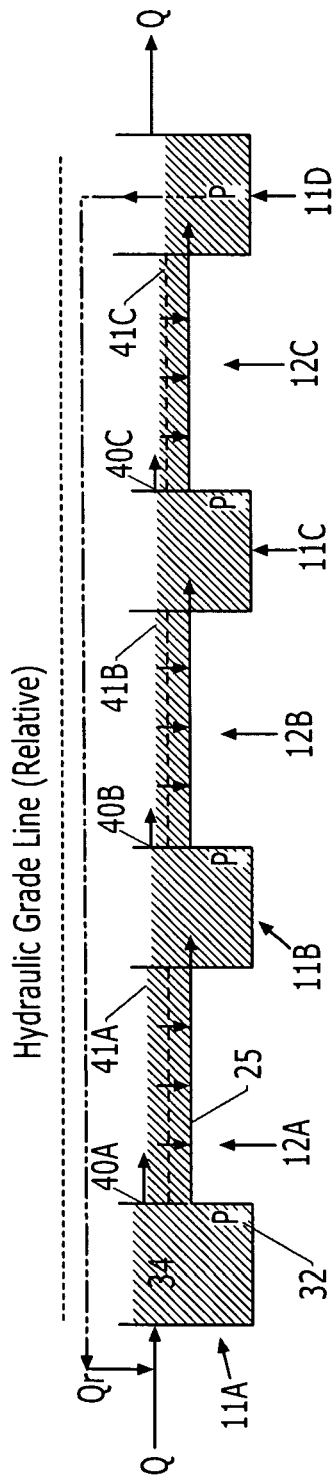
FIG. 5 is a cross-sectional view of an embodiment of the system of the present invention in passive flow mode.

In another embodiment, illustrated in FIG. 5, the outlets 40A–40C of the first through the third lagoons 11A–11C are positioned above the surfaces 41A–41C of the first through third marsh cells 12A–12C, respectively, for permitting gravity flow therebetween, as shown by the "hydraulic grade line" in FIG. 5, which is exaggerated for graphic clarity. Downward arrows depict flow through plant roots and media into the bottom drain 25.

Figure 4:
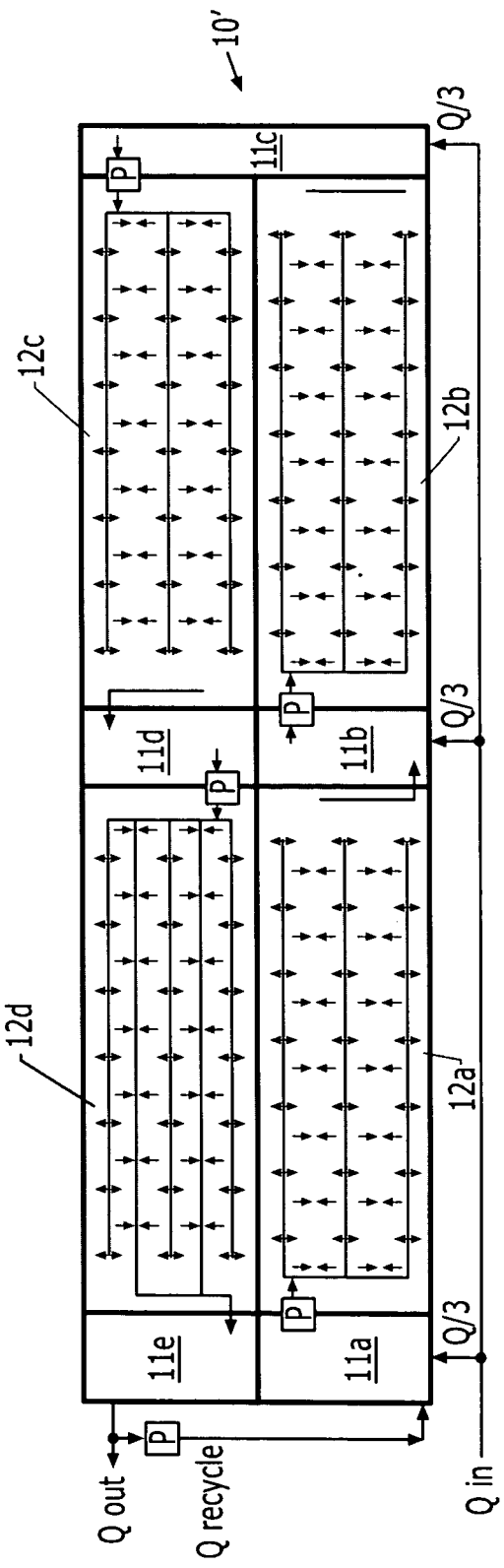
FIG. 4 is a plan view of an exemplary layout of the system of the present invention.

Another feature of the present invention comprises step feed, wherein at least one lagoon, second lagoon 11b, for example (FIG. 4), downstream of the first lagoon 11a also has an inlet 42 for receiving wastewater to be treated in parallel with the first lagoon 11a, for reducing an influent mass loading on the first lagoon 11a. As illustrated in FIG. 4, the influent flow $Q_{in}$ is divided by 3 among the first three lagoons 11a–11c (Q/3) in the illustrative example of system 10' depicted. The effluent is also shown as being divided between the flow exiting the system $Q_{out}$ and the flow channeled for recycling $Q_{recycle}$. In this embodiment an alternate physical arrangement of the component lagoons 11a–11e and marsh cells 12a–12d is illustrated. Here the path length for recycle flow $Q_r$ from the final lagoon 11e to the first lagoon 11a is minimized by arranging the flow to proceed in generally circular fashion about the system 10'. In FIG. 4 the surface distribution system is shown by the outward-pointing arrows; the underdrain system is indicated by the inward-pointing arrows. It will be understood by one of skill in the art that the specific spacing of the distribution and underdrain system is a site-specific design determination.

The system 10 design is discussed in the following in two parts: hydraulic and process design. Both hydraulic and process designs contain novel elements and combinations thereof. Hydraulic design integrates passive forward flow, tidal flow, and recycle flow into one design. No such integration is known to exist in the prior art. Process design integrates wetland and lagoon treatment technology in a novel way that is an improvement over the existing state of the art in lagoon, wetland, and combined lagoon/wetland wastewater treatment systems. Process design includes elements of environmental and ecological engineering design that significantly improve the state of art of wetland wastewater treatment.

Hydraulic Design

Vertical flow marsh cells 12 in a particular embodiment are preferably shallow, with a total media depth of four feet or less. As detailed above with reference to FIG. 2, each VF marsh cell 12 in a preferred embodiment comprises a substantially impermeable basin, a bottom drain collection system, a layer of media covering the bottom drain collection system, at least one layer of treatment media above the media covering the bottom collection system, plants rooted into the treatment media, and a surface distribution system overlying the treatment media and plant roots. Preferably plants are initially rooted in a mat such as a coir mat or fabric, or equivalent organic medium, placed on the surface of the media.

Vertical flow marsh cells 12 in this embodiment are designed to fill to a level that creates a free water surface. The process design rationale for free water surfaces is discussed below. The free water surface may have an operating depth up to two feet. Free water surface depths up to four feet are acceptable for short durations (see the section on process design to follow).

Lagoons 11 are typically deeper than VF marsh cells 12. As detailed above, each lagoon 11 preferably comprises of an impermeable basin, watertight penetrations from the marsh bottom drain system, effluent penetrations at a greater depth than influent penetrations from the marsh bottom drain system, and a pump station capable of pumping the lagoon water level down to the depth of the effluent penetrations. In the event that a pump station is used in place of a lagoon, lagoon specifications apply to hydraulic profiles and appurtenances.

In the embodiment of FIG. 3, influent enters the first lagoon(s) 11a and associated pump station(s) 32a. The water level rises, triggering a level-sensing device that actuates a pump. The pump then transfers water from the lagoon 11a (or other type of pretreatment basin) to the adjacent, downstream marsh treatment cell 12a. Alternatively, water may flow out of the lagoon (or pump station) via overflow piping (FIG. 5). Pipes used to transfer water downstream may have check valves that only permits flow to go forward.

Step feed of VF marsh cells 12 as depicted in FIG. 4 will be discussed in detail in the process design section below. The exact configuration of step feed is a process determination based on influent mass loading. The hydraulic regime described below is valid for any design.

Water is discharged into each VF marsh cell 12 via a distribution system 31 at the surface of the marsh media bed. The distribution system 31 may discharge influent substantially evenly over the surface of the VF marsh cell 12, as shown in FIGS. 3–5, although this has been found neither necessary nor desirable, unless multiple points of influent are required to attenuate pumped water velocity sufficiently to avoid scouring of plants 29 and media 27. If a surface distribution system 31 is used, it typically is configured as a low-head system for energy efficiency. An example of low-head distribution piping is a large-diameter, slotted irrigation pipe such as that known for use in agricultural applications. An open-channel distribution system is another example of a low-head distribution system. Examples of low-head hydraulic conveyance machinery include axial flow propeller pumps and airlift pumps.

Influent flows from the piping 31 down through plant roots 291 and media 27. During a fill stage influent may not flow downward evenly throughout the cell 12 in all embodiments, but flow is substantially vertical during drainage. The underdrain piping system 25 collects water at the bottom of the VF marsh cell 12. Water collected in the underdrain system 25 flows into the adjacent, downstream lagoon 11 or pump station 32. The VF marsh cell 12 and downstream, adjacent lagoon 11 (or pump station 32) then fill to approximately the same water level. A small difference in water level may be caused by head loss in the VF marsh cell 12 and marsh drainage system 25.

A pump 32 conveys water from the lagoon 11 into the adjacent, downstream VF marsh cell 12 and then a downstream lagoon 11 (or pump station 32). As the pump 32 conveys water downstream, the water level is drawn down in the VF marsh cell/lagoon (or pump station) pair 12/11 being pumped. The water level may be drawn down sufficiently in the pumped lagoon 11 (or pump station 32) to dewater an adjacent, upstream VF marsh cell 12. Unless there is influent flow to the VF marsh cell 12 while drain pumping is in progress, the marsh media/root matrix 27/291 is drained to effective field capacity, wherein field capacity may be defined as the water retained in the marsh media/ plant root matrix 27/291 after downward gravity drainage has ceased or has been reduced to a substantially insignificant trickle.

Pumping continues successively from one VF marsh cell 12 and lagoon 11 (or pump station 32) pair to the next such that some pairs may be full, some drained, and others filling (see, for example, the exemplary time sequence depicted in FIG. 3). The preferred minimum number of VF marsh cell 12 and lagoon 11 pairs is two; the preferred maximum number is a design decision determined by influent strength and desired effluent quality.

Pumping may be controlled by level-sensing devices linked, for example, to an electromechanical or programmable logic controller or by manual actuation from skilled operations personnel. Other sensing devices, such as, but not limited to, dissolved oxygen (DO) or oxidation/reduction potential (ORP) meters may also actuate pumps. Water from the final lagoon (or pump station) may be recycled at a rate of 50% to 1000% of forward flow, depending on process design, wherein "forward flow" is defined as the average daily flow rate of influent received by the system 10.

The periodicity of fill and drain cycles in a given marsh cell/lagoon pair 12/11 may be on the order of several times per day, weekly, or even longer time spans (see the following section on process design).

Pumping is not necessary for forward flow to pass through the system 10. Forward flow may also be passive, in an overflow mode, from marsh cell 12 to lagoon 11. Each lagoon 11 (or pump station 32) preferably has overflow piping. Water overflowing into the adjacent and downstream marsh cell 12 flows through the surface distribution system 31, and then down through plant roots 291 and marsh media 27 to reach the bottom drain collection system 25. From the bottom drain collection system 25, water flows into the adjacent and downstream lagoon 11 (or pump station 32). Water then flows into the next marsh cell 12, and so on, until discharge or recycle from the final lagoon 22 (or pump station 32). The overflow mode may be used for selected marsh cell/lagoon (or pump station) pairs 12/11 in the system 10, depending on design considerations to be discussed below.

Surge capacity is inherent to the hydraulic design. Lagoons 11 and free water surfaces in marsh cells 12 provide significant surge capacity even under passive forward-flow conditions. Lagoons 11 typically have significantly more surge capacity than marsh cells 12 per unit of area because of their greater depth and the lack of media therein. Surge capacity is believed important for wastewater peak flows and for stormwater treatment. For the latter, the first 1–2 inches of rainfall runoff over a given urban or semi-urban watershed could be treated in an appropriately sized system 10 without the need for separate detention basins.

Hydraulic design is used to minimize head loss. Excessive head loss decreases pump energy efficiency and inhibits passive forward flow because water levels could back up in the treatment system 10 sufficiently to overflow containment. Hydraulic design can be used to minimize head loss by appropriate specification of larger-diameter pipe sizes, careful selection of marsh media 27, sufficient freeboard in VF marsh cells 12 and lagoons 11 (or pump stations 32), and other process design considerations to be discussed below. ("Freeboard" is the distance from the high water level to the top of a containment vessel, that is, the distance water must rise to overflow the containment vessel.) It is also important to ensure there is sufficient freeboard in VF marsh cells 12 and lagoons 11 to contain water backed up by dynamic head loss under surge flow conditions.

Process Design

The system 10 of the present invention is adapted to receive influent wastewater containing many constituents that are removed by a variety of mechanisms as it flows through the treatment system (Table 1).

Effect of Hydraulic Design on Process Design

Vertical-flow wetlands are significantly less prone to clogging than are horizontal subsurface flow wetlands. Plant roots tend to prevent clogging in vertical-flow wetlands[8] because a large portion of the root mass grows parallel to flow paths. Vertical flow paths permit fine inorganic particles to migrate downward into the collection system 25 and out of the marsh cell 12, helping to prevent clogging of interstitial media pore spaces. In contrast, plant roots tend to have a negative effect on hydraulic conductivity in SSHF wetlands.

Tidal fluctuation aerates media biofilms, which also helps prevent media interstitial pore spaces from filling with bacteria biomass (Refs. 11 and 13 and U.S. Pat. No. 5,863, 433). Therefore, tidal vertical flow hydraulics tend to maintain design hydraulic flow paths. In contrast, horizontal subsurface flow wetlands frequently tend to channel and clog.

Vertical-flow wetlands can clog, however. Clogging is a result of high organic loading on fine sand and soil media.[10] The standard European design vertical-flow wetland design employs fine sand that requires prolonged, drained, rest periods after loading. These periods range from several hours to day to avoid clogging.[9] Therefore, selection of wetland media can be a critical parameter in developing an optimal hydraulic design.

Fine sand is inappropriate for tidal vertical wetland designs because of the long drained resting periods. The present design preferably uses aggregates 27 no smaller than one-millimeter ($d_{10}$) nominal diameter for tertiary treatment and no smaller than four millimeters ($d_{10}$) nominal diameter for primary and secondary treatment. Primary, secondary, and tertiary treatment are terms that are most meaningful in the context of activated sludge treatment. Here primary and secondary are taken to refer to wetland/lagoon cells with wastewater that is just beginning treatment (primary) or still retains $BOD_5$ or TSS concentrations on the order of 30 mg/L. Tertiary treatment refers to effluent being treated to $BOD_5$ or TSS concentrations to substantially less than 30 mg/L and that is undergoing substantial nitrification. The uniformity coefficient, which is a measurement known in the art of a diameter size range of individual particles in a given batch of media, is less than or equal to 4, with a value of less than or equal to 2 preferred. In some applications, high-porosity plastic media may comprise part of the marsh media 27. High-porosity plastic media is defined as having a pore volume fraction of at least 80% of the media bulk volume. These media specifications, which are intended as exemplary and not as limitations, allow drained resting periods as short a few minutes without significant loss of hydraulic conductivity due to accumulation of biomass in interstitial pore spaces.

The type of aggregate material selected can also increase hydraulic conductivity. The preferred aggregate is expanded shale, although this is not intended as a limitation. Expanded shale is a ceramic produced by the baking of shale in a rotary kiln at sufficiently high temperatures to induce vitrification of semimolten, steam-expanded shale, thereby transforming shale into a lightweight ceramic product. The advantage of expanded shale is that it has a low bulk density, 55 to 60 lbs/ft$^3$. Low bulk density permits easier penetration by plant roots, and root penetration into expanded shale aggregate marsh beds has been observed to extend beyond 2 feet after only a few months of growth. As noted above, penetration by plant roots increases hydraulic conductivity.[8]

Lagoons are another element of hydraulic design that significantly affect process design. Lagoons serve as a refuge for zooplankton and other invertebrate grazing organisms that consume bacterial biomass generated from wastewater nutrients. The effect of these organisms on treatment is described below in the section on ecological design elements.

TABLE 1

Fate of Wastewater Constituents in Integrated TVFM Treatment System

| Influent Wastewater Constituents | Initial Fate in Integrated TVFM System | Final Fate in Integrated TVFM System |
|---|---|---|
| $BOD_5$ | Aerobic/anoxic conversion to bacteria biomass (VSS) in initial lagoons (bacterioplankton)/tidal vertical flow marshes (biofilms & bacterioplankton) | Conversion to $CO_2$ from endogenous aerobic respiration in drain cycle of tidal vertical flow marsh cells<br>Conversion to $CO_2$ by grazer biomass in lagoons/tidal vertical flow marsh cells |
| TKN | Conversion to $NH_4^+$ in initial lagoons and vertical flow marsh cells | Greater than 95% conversion to $NH_4^+$ by final lagoon/VF marsh cells. |
| $NH_4^+$ | Sorption on marsh cell media, biofilms, organic material, and plant roots<br>Aerobic conversion (nitrification) to $NO_3^-$ in marsh cell biofilms with exposure to atmospheric oxygen when marsh cells are drained<br>Oxidation by anaerobic ammonia oxidizing bacteria | Substantially complete conversion to $N_2$ by bacterial respiration |
| $NO_3^-$ | Desorption from biofilms into bulk water when marsh cells are flooded<br>Conversion to $N_2$ (denitrification) in initial lagoons/tidal vertical flow in flooded marshes<br>Both aerobic and anoxic denitrifying heterotrophic bacteria likely to be responsible for this process | Substantially complete consumption of nitrate by discharge |
| TSS | Inorganic constituents filtered out in tidal vertical flow marshes | Inorganic constituents filtered out in tidal vertical flow marshes |
| VSS | Conversion to $BOD_5$ and TKN in initial lagoons/tidal vertical flow marshes<br>Recalcitrant VSS filtered out in tidal vertical flow marshes | Conversion to $CO_2$ from endogenous aerobic respiration in drain cycle of Tidal VF marsh cells<br>Conversion to $CO_2$ from endogenous aerobic respiration when flooded by recycle from final marsh cell that is essentially free of labile carbon<br>Conversion to $CO_2$ by grazer biomass in lagoons and tidal VF marsh cells |
| Human Enteric Pathogens | Helminth ova (20–70 μm) consumed by crustacean zooplankton and larger filter feeders<br>Protozoan cysts (1–30 μm) consumed by rotifers, crustacean zooplankton, and larger filter feeders<br>Bacteria (0.3–10 μm) consumed by protozoa, rotifers, crustacean zooplankton, and larger filter feeders<br>Viruses (0.02–0.08 μm) probably unaffected by grazing or filter feeding | Continuation of initial process to complete minimum two-log removal (99%) of helminth, protozoan, and bacterial pathogens<br>Limited die off of human enteric viral pathogens in drain and fill cycles of VF marsh cells |

Hydraulic design is also employed to minimize clogging and support robust ecological communities. Step feed and recycle have significant effects on both processes. Step feed distributes influent mass loading of marsh cells over a much larger surface area, thereby greatly reducing clogging of marsh media (see FIG. 4, for example). Reduction of clogging in the marsh cells promotes flexibility and efficiency in system design.

Recycle with step feed permits high nominal recycle ratios for marsh cells receiving influent wastewater. Step feed has been used in water hyacinth wastewater treatment lagoons,[17] but has not been widely adopted as an element of wetland wastewater treatment design.[1,3] Even modest recycle rates ($Q_{recycle} \leq 3Q$) with step feed create high recycle ratios that significantly dilute influent wastewater (Table 2). Dilution of high-strength influent partially buffers populations of grazing organisms from low dissolved oxygen concentrations and high ammonia concentrations. Large, stable populations of grazing organisms consume organic materials and bacterial biomass that might otherwise tend to clog wetland media (see the section on ecological design elements).

TABLE 2

Effect of Step Feed and Recycle on Influent Parameter Concentrations

| | Influent Conc. | \multicolumn{9}{c|}{Effect of Nominal Dilution Ratio on Influent Concentration in Receiving Lagoon Cells} |
|---|---|---|---|---|---|---|---|---|---|---|
| | | L1 | | | L2 | | | L3 | | |
| Param. | Conc. | 3:1 | 6:1 | 9:1 | 4:1 | 7:1 | 10:1 | 5:1 | 8:1 | 11:1 |
| BOD, mg/L | 250 | 83 | 42 | 27 | 63 | 36 | 25 | 50 | 31 | 23 |
| TKN, mg/L | 50 | 17 | 8 | 6 | 13 | 7 | 5 | 10 | 6 | 5 |
| TSS, mg/L | 120 | 40 | 17 | 13 | 30 | 14 | 12 | 24 | 13 | 11 |

Dilution also stimulates endogenous respiration of biofilms because it causes low concentrations of labile carbon in bulk water. Endogenous respiration of biofilms prevents excessive build-up of bacterial biomass, thereby tending to preserve the hydraulic conductivity of the media beds.

Hydraulic design also substantially affects process design as measured by oxidation-reduction potential (ORP), dissolved oxygen (DO) concentrations, pH, and turbidity.

An exemplary embodiment of the present invention 10 comprises a pilot system comprising five marsh cells 12 and five drainage sumps that treat 500 gpd of manufactured wastewater (powdered cheese whey and 98% urea fertilizer pellets). In this embodiment the drainage sumps are scaled to the surface area and volumes of lagoon cells 11 for larger systems 10. Influent is fed substantially equally into marsh cells 12a–12c that are drained by sumps 32a–32c, respectively. Marsh cells 12d, 12e receive discharge from lagoons 11c, 11d, respectively, and are drained by sumps 32d, 32e, respectively. Approximately 4000 gpd are recycled from sump 12e to marsh cell 12a.

Although the first three marsh cells 12a–12c receive substantially the same mass loading, the third cell 12c is clearly the most heavily loaded, as measured by ORP and DO (Table 3). Distribution of influent wastewater by step feed elevates ORP and DO in marsh cells 12a, 12b, reducing instantaneous mass loading, as can be seen in comparison with the ORP and DO values in marsh cells 12a, 12b when cell 12a is point loaded (no step feed) with all influent wastewater (Tables 3 and 4). The observed mean ORP values in step-fed marsh cells are above those associated with sulfur-reducing bacteria that produce hydrogen sulfide ($H_2S$), whereas mean ORP values in cell 12a receiving all influent are within the range of $H_2S$ production. Strong $H_2S$ odors were observed emanating from marsh cell 12a during the period of the ORP measurements represented in Table 4.

TABLE 3

Effects of step feed and process recycle on key process parameters in a TVFM pilot

| | | DO, mg/L | ORP, mV | pH | ntu |
|---|---|---|---|---|---|
| Sump 12a | mean | 0.4 | 26.4 | 8.8 | 12.8 |
| | n | 282 | 282 | 282 | 282 |
| | STDEV | 0.3 | 51.4 | 0.3 | 3.2 |
| | Max | 2.1 | 430.0 | 10.3 | 32.2 |
| | Min | 0.0 | −199.0 | 7.9 | 2.8 |
| Sump 12b | mean | 0.5 | 105.5 | 8.6 | 16.7 |
| | n | 324 | 324 | 324 | 321 |
| | STDEV | 0.5 | 76.3 | 0.2 | 10.1 |
| | Max | 3.2 | 425.0 | 10.3 | 143.8 |
| | Min | 0.0 | −230.0 | 7.6 | 3.2 |
| Sump 12c | mean | 0.3 | 55.5 | 8.7 | 15.2 |
| | n | 290 | 290 | 290 | 276 |
| | STDEV | 0.4 | 130.3 | 0.4 | 5.0 |
| | Max | 3.4 | 502.0 | 10.6 | 57.0 |
| | Min | 0.0 | −215.0 | 7.3 | 3.2 |
| Sump 12d | mean | 1.2 | 395.2 | 7.5 | 9.8 |
| | n | 191 | 191 | 191 | 178 |
| | STDEV | 0.5 | 116.6 | 0.2 | 2.1 |
| | Max | 3.6 | 553.0 | 8.5 | 23.8 |
| | Min | 0.0 | −131.0 | 6.8 | 4.0 |
| Sump 12e | mean | 2.4 | 523.6 | 7.6 | 6.8 |
| | n | 428 | 428 | 428 | 427 |
| | STDEV | 0.7 | 33.1 | 0.1 | 3.1 |
| | Max | 4.4 | 572.0 | 8.1 | 41.0 |
| | Min | 0.4 | 358.0 | 7.3 | 3.3 |

TABLE 4

Effect of point loading (no step feed) to first marsh cell

| | Sump 12a | | Sump 12b | |
|---|---|---|---|---|
| | DO, mg/L | ORP, mV | DO, mg/L | ORP, mV |
| Mean | 0.1 | −45.6 | 0.1 | 135.8 |
| n | 91 | 91 | 92 | 92 |
| STDEV | 0.2 | 30.6 | 0.1 | 60.7 |
| Max | 1.5 | 83 | 0.7 | 207.0 |
| Min | 0.0 | −90 | 0.0 | −65.0 |

Elimination of $H_2S$ production is an important result of step feed and recycle. Hydrogen sulfide is poisonous to many microorganisms, particularly protozoa and invertebrates, and is also toxic to humans.

Dilution of influent wastewater nitrogen species concentrations (TKN, $NH_3$, and TKN) also has a positive impact on root length. Root length in aquatic plants is commonly inversely proportional to ammonia and nitrate concentrations. High influent ammonia and nitrate concentrations result in aquatic plants (in most species) with short roots. Plants with longer roots in turn have a positive effect on the hydraulic conductivity of marsh media. Plants are also harmed by high $H_2S$ concentrations, and thus elimination of $H_2S$ reduces stress to plants.

High ORP values and positive DO recycled from sump 32e of marsh cell 12e to marsh cell 12a elevate ORP and DO concentrations in marsh cell 12a. Elevation of ORP and DO increase treatment rate processes in marsh cell 12a, which increases overall treatment rates. As shown by the following calculation:

$$RF \times Q \times DO_{eff} = gO_2 \text{ recycled per day} \quad (1)$$

where Q is the influent flow of 1.89 m³/d, RF is the recycle factor, $Q_r = Q \times RF = 8 \times 1.89$ m³/d = 15.12 m³/d, and $DO_{eff}$ is the mean dissolved oxygen concentration, 2.4 mg/L. Recycle from the final marsh cell 12e to the first marsh cell 12a thus adds approximately 36 g O₂/d to the first cell 12a. 36 grams of oxygen per day represents 10–15% of the bulk water oxygen demand of the system 10 (see Table 6). Increase of oxygen to the heavily loaded initial cells is directly proportional to recycle rates.

A particular goal of the present invention is to provide up to advanced tertiary treatment, and advanced secondary treatment at a minimum (Table 5). Wastewater can contain many constituents. Constituents of concern for the present system design are biochemical oxygen demand (BOD), volatile suspended solids (VSS), total suspended solids (TSS), total Kjeldahl nitrogen (TKN), ammonia ($NH_4^+$), nitrate ($NO_3^-$), total nitrogen (TN=TKN+$NO_3^-$), total phosphorus (TP), and pathogens. These constituents are removed from wastewater in the present system as described in Table 1.

TABLE 5

Integrated TVFM System Treatment Standards for Domestic Sewage

| Wastewater Constituent | Advanced Secondary Treatment Standards | Tertiary Treatment Standards | Advanced Tertiary Treatment Standards |
| --- | --- | --- | --- |
| BOD, m/L | ≦20 | ≦10 | ≦5 |
| NH₃, mg/L | ≦5 | ≦1 | ≦1 |
| TN, mg/L | ≦20 | ≦10 | ≦5 |
| TSS, mg/L | ≦20 | ≦10 | ≦5 |
| Fecal coliforms,[a] mpn/100 ml | ≦100 | ≦10 | ≦2.2 |

[a]Post-disinfection values from final effluent. Lower fecal coliform standards can be obtained with supplementary effluent filtration prior to disinfection.

Most treatment takes place within the marsh cells because of the large surface area of biofilms associated with media and plants. Lagoons provide important treatment functions in service of the function of the marsh cells, as described elsewhere herein. Lagoon cells are therefore typically significantly smaller than the marsh cells, although this is not intended as a limitation.

Nitration and Aeration

The system of the present invention relies substantially on nitrate to drive consumption of organic carbon in wastewater, as measured by BOD or COD. Literature and pilot data indicate that nitrification and denitrification in tidal vertical-flow marshes are governed by adsorption chemistry.[32] In this process, $NH_4^+$ ions in bulk water adsorb to negatively charged biofilms. Atmospheric oxygen is drawn down into marsh bed pore spaces when the marsh cell drains, causing rapid aeration of biofilms and subsequent nitrification of adsorbed $NH_4^+$ ions. Nitrate in biofilms desorbs into bulk water in the next flooding cycle. Nitrate is then rapidly consumed in bacterial respiration of carbon. The term nitration is coined here, by analogy to aeration, as a convenient way to denote the transfer of nitrate to bulk water by the ammonia sorption/nitrate desorption process.

The present system is designed to transfer oxygen directly into bulk wastewater primarily by passive atmospheric diffusion across open water surfaces in marsh cells and lagoons. Transfer of oxygen into bulk water is a low-rate process. Mechanical aeration of water is therefore virtually ubiquitous in wastewater treatment systems. Oxygen transfer efficiency is greatly limited by the low solubility of oxygen in water. Clean, cold freshwater saturates at 10–12 mg/L $O_2$. Saturation of $O_2$ in wastewater is substantially less. The oxygen transfer efficiency of mechanical aeration processes in wastewater is typically on the order of 5–20% depending upon a variety of factors.

In contrast to oxygen, nitrate is highly soluble in water. Organic nitrogen and ammonia (TKN) is typically present in wastewater in concentrations from 20 to 85 mg/L, which is several times that of the saturation value of oxygen in wastewater. Low-head pumps used in draining of marsh cells have mechanical transfer efficiencies on the order of 80%. Therefore, ammonia is converted to nitrate via a mechanical means that is several times more efficient than mechanical transfer of oxygen to bulk wastewater. Nitrate per kilogram has the same oxidizing capacity of 2.86 kg of oxygen. Therefore, overall the energy efficiency for BOD (or COD) destruction of the nitration process is substantially greater than for aeration.

Pumping also aerates by turnover of the water in column marsh and lagoon cells. Although not designed as a mechanical aeration process, drain and fill pumping transfers sufficient oxygen to bulk water to consume remaining BOD in the wastewater, as will be discussed in the following.

Lagoons may be partially mixed by mechanical means or aerated semipassively by atmospheric diffusion. In the latter, turnover of the lagoon water column occurs during flood and drain cycles. Mechanical aeration of lagoons is used as an ancillary process principally to prevent transient low dissolved oxygen conditions that would kill protozoa and invertebrates that consume bacterial biomass, but also to avoid nuisance conditions, such as periodic aeration to drown mosquito larvae.

Aeration of bulk water in the present system 10 is semipassive because aeration design relies substantially on transport of oxygen into bulk wastewater by atmospheric diffusion during tidal fluxes. Frequent turnover of marsh and lagoon water columns is ensured by the mixing energy inherent in tidal flow pumping. This mixing energy may be optimized by directing flow entering a lagoon from the upstream marsh cell toward the lagoon surface. Stratification of the marsh or lagoon water column is substantially prevented by this turnover. Frequent turnover of the water column enhances aeration by diffusion at the atmosphere-water interface.

Oxygen for nitrification is provided during the postdraining period when air is in contact with biofilms in the marsh cell beds. Ammonia ions absorbed in biofilms nitrify when in contact with atmospheric oxygen as a consequence of bacterial metabolism. Desorption of nitrate during the fill phase provides significant quantities of nitrate to drive bacterial metabolism of labile carbon in the bulk liquid. It should be noted that many bacteria use nitrate as a terminal electron acceptor even in the presence of high dissolved oxygen concentrations.

Nitration and semipassive aeration permit the system 10 of the present invention to have a footprint that is substantially smaller than prior art systems because of the positive effect nitration and semipassive aeration have on process kinetics. The combined lagoon and marsh cell footprints are one-quarter to one-half the size of conventional wetland wastewater treatment systems receiving the same flows, consume significantly less energy than aerated lagoons, and provide a level of treatment unattainable by lagoon treatment systems or conventional wetlands alone or in combination.

Modeling of nitration and aeration processes appears to be complex because of inherent difficulties in measuring key parameters for thin biofilm kinetics. However, insight into the efficiency of nitration and aeration in the present system is straightforward using classic oxygen-demand stoichiometry and oxygen transfer kinetics to bulk water. The oxygen demand in wastewater is calculated using the following formula for bulk water oxygen demand for activated sludge processes:

$$\text{mg/L } O_2 \text{ demand} = (COD_{influent} - COD_{effluent}) + 4.6(NO_3)_f - 2.86(NO_3)_u \quad (2)$$

where COD is the chemical oxygen demand in mg/L, $(NO_3)_f$ is the nitrate formed in mg/L, and $(NO_3)_u$ is the amount of nitrate utilized in mg/L.

The nitrification oxygen demand term in Eq. (2) for bulk water oxygen demand drops out in the process of the present invention. Nitrate is formed in drained marsh cells, removing the nitrification term $[4.6(NO_3)_f]$ from the equation. Thus oxygen demand for bulk water can be determined in the marsh cells as follows:

$$\text{mg/L } O_2 \text{ demand} = (COD_{influent} - COD_{effluent}) - 2.86(NO_3)_u \quad (3)$$

Thus in Eq. (3) a significant fraction of COD is consumed by nitrate, formed when marsh cells drain and desorbed into bulk water when marsh cells are flooded. The difference in oxygen demand as calculated by the above equations for the same wastewater flow and influent parameters is significant (Table 6). The nitration process reduces bulk-water oxygen demand by 20–50%. The actual percent reduction is sensitive to the influent COD:TKN ratio.

The transfer coefficient is empirically derived and is a function of the dissolved oxygen concentration, temperature, and turbulence of the bulk water. A value of $K_d = 0.10$ is reasonable for water volumes with temperatures near 20° C. that are turned over throughout the day. Oxygen saturation in wastewater at 20° C. is approximately 9.00 mg/L. Values from a pilot study of V=3.2 m³ and area=9.4 m² are used to complete a calculation of Eq. (4).

The equation for bulk water specific oxygen transfer for the present system is:

$$OT = (0.1/h \times 9.00 \text{ mg/L} \times 24 \text{ h/d} \times 3.2 \text{ m}^3 \times 1000 \text{ L/m}^3 \times 10^{-3} \text{ g/mg})/9.4 \text{ m}^2 \quad (5)$$

$$= 7.5 \text{ g } O_2/\text{m}^2/\text{d}$$

Turnover of the bulk water volumes increases the effective transfer surface area on a daily basis. Taking daily flood and drain cycles at eight per cell per day (one cycle per cell approximately every 3 h) increases the effective oxygen transfer area by a factor proportional to recycle flow, taken here for simplicity to be eight. (The actual calculation involves differential equations for each cell, an account of oxygen transfer to thin films in the drained cycle, and a determination of $K_d$ for marsh and lagoon cells under this operating regime. The simplifying assumptions here are conservative.) A key concept here is that free water surfaces during the flooded stage are crucial to oxygen transfer. Without a free water surface, the effective surface area for oxygen transfer must be reduced by a factor approximately equal to media porosity.

TABLE 6

Comparison of bulk-water oxygen demand

| System | Influent COD, mg/L | Influent COD, mg/L | Influent TKN, mg/L | Percent conversion of TKN to nitrate | Nitrate formed, mg/L | Effluent nitrate, mg/L | Oxygen demand, mg/L |
|---|---|---|---|---|---|---|---|
| Activated sludge (with nitrification and denitrification) | 400 | 10 | 45 | 95% | 42.75 | 5.0 | 478 |
| TVFM | 400 | 10 | 45 | 95% | 42.75 | 5.0 | 282 |
| Eq. 2 | mg/L $O_2$ = (400 − 10) mg/L + 4.6(42.75) mg/L − 2.86(42.75 − 5.0) | | | | | | |
| Eq. 3 | mg/L $O_2$ = (400 − 10) mg/L − 2.86(42.75 − 5.0) | | | | | | |

The pumping process required for nitration meets the bulk water oxygen demand. As marsh and lagoon cells flood and drain, cell volume undergoes repeated turnover throughout the day. Transfer of oxygen by diffusion from the atmosphere is facilitated by this turnover process, as can be observed in the following calculations. The equation for the oxygen transfer (OT) from the atmosphere across the surfaces of the present invention is as follows:

$$OT = (K_d \times C_T \times 24 \text{ h/d} \times V \times 1000 \text{ L/m}^3 \times 10^{-3} \text{ g/mg})/\text{area} \quad (4)$$

where $K_d$ is the oxygen transfer coefficient in h⁻¹, CT is the oxygen saturation value at a temperature T in mg/L, V is the bulk water volume in m³, and the area is in m².

An increase in the effective surface area by free water surfaces combined with flood and drain cycles increases the daily oxygen transfer to the marsh system as follows:

$$8 \times 9.4 \text{ m}^2 \times 7.5 \text{ g } O_2/\text{m}^2/\text{d} = 540 \text{ g } O_2/\text{d} \quad (6)$$

It must then be determined whether 540 g $O_2$/d is sufficient oxygen transfer to meet the required oxygen demand of bulk water in the pilot. The daily oxygen mass requirement of bulk water in the pilot system is:

$$[400 \text{ mg/L } COD - 2.86(42.7 \text{ mg/L } NO_3)] \times 1.89 \text{ m}^3/\text{d} \times 1000 \text{ L/m}^3 \times g/1000 \text{ mg} = 525 \text{ g } O_2/\text{d} \quad (7)$$

Equations (6) and (7) are essentially in agreement with observation of the pilot, which consistently discharges fully treated water (BOD≦5 mg/L, TSS≦5 mg/L, total nitrogen≦3 mg/L) with a positive dissolved oxygen concentration. Both empirical observation and simple modeling confirm that tidal drain and fill cycles sufficient for nitration also promote sufficient transfer of atmospheric oxygen across free water surfaces to satisfy oxygen demand unmet by nitrate.

Biochemical Oxygen Demand

Biochemical oxygen demand is removed from wastewater in the present system mostly through anoxic and aerobic processes. Nitration and aeration for these processes has been described above.

Biochemical oxygen demand is a lumped parameter that measures the oxygen demand produced by bacterial metabolism of labile carbonaceous matter and nitrification of ammonia. Biochemical oxygen demand also measures release of these compounds from decomposition of organic particulates, and lysis of bacterial cells undergoing endogenous respiration. Uptake of labile carbonaceous matter is very rapid. Nitrification lags behind BOD removal. Decomposition of organic particles and endogenous respiration of bacterial cells is slower than uptake of labile carbon. Decomposition rates depend on particle size, particle material, and design of the treatment system.

Heterotrophic bacteria consume labile carbon and digest organic particles. Heterotrophs typically produce zoogleal exudates composed of polysaccharides. Excessive polysaccharide production within marsh media can clog pore spaces. It is therefore important to distribute raw, or minimally treated, wastewater over a large area by step feed to ensure media retains design hydraulic conductivity.

The integrated system design of the present invention takes advantage of the types of heterotrophic bacteria that are formed in treatment systems. Heterotrophic biomass within the marsh cells will be composed mostly of biofilms attached to media, plant roots, and plant thatch. Within the lagoons, heterotrophic biomass will be composed mostly of bacterioplankton. Bacterioplankton are composed mostly of single-cell bacteria ranging in the approximate size class of 0.1–10 μm. Limited flocculation of bacterioplankton will occur, but without a clarifier to enrich floc-forming heterotrophs, as in an activated sludge treatment system, flocs will not dominate bacterial biomass within the lagoons.

A significant fraction of labile wastewater nutrients can be converted into bacterioplankton in lagoons. Bacterioplankton are bacteria adapted to live in the open water, comprising single cells or small flocs. Wastewater constituents reaching marsh cells pass vertically through marsh media, plant roots, and plant thatch. Horizontal dispersion occurs through the media, plant roots, and plant thatch. Biofilms develop on these surfaces. Marsh cells and lagoons have differing microbial ecologies; marsh cell ecology is substantially based on biofilm communities; lagoon ecology is substantially based on suspended bacterioplankton communities. (The ecology base refers to the lowest trophic level.) Each is an ecotype.

Distribution of bacterial biomass into different ecotypes reduces bacterial yield (see below) by exposing it to a broad array of grazing organisms. Bacterioplankton are the food source for a diverse array of organisms in the lagoons and within the marsh cells. Bacterioplankton are converted into carbon dioxide by respiration of organisms that consume them and are incorporated into the biomass of the consumer organisms. Biofilms are similarly transformed into carbon dioxide and consumer biomass by a different set of grazing organisms. These processes of mass transfer are described in greater detail in the Ecological Design Elements section below.

The lagoon cells reduce the concentration of BOD reaching the marsh cells. By doing so, marsh cells produce less bacterial biomass. Reduction of bacterial biomass, in turn, helps preserve design hydraulic conductivity of the marsh media. Preservation of hydraulic conductivity maintains design treatment performance of marsh cells.

Suspended Solids, Yield, and Biofilms

Raw wastewater contains suspended solids that are either organic or inorganic in nature. Bacteria grow on wastewater nutrients, thereby producing additional organic solids that are either suspended in bulk water or fixed as biofilms on solid substrates. Yield of bacterial biomass grown from influent nutrients is defined as mass units of bacteria produced from mass units of influent BOD and total nitrogen. Suspended solids, yield, and biofilms are all related in the present system. All must be accounted for in the treatment process. As described below, mechanisms of in situ digestion of VSS and biofilms are key elements of the present system, which reduces yield to a fraction that is effectively zero on an annual operating basis.

Suspended Solids

Total suspended solids (TSS) is a lumped parameter that measures the organic and inorganic particle mass in a water sample. Volatile suspended solids (VSS) is the measure of the organic content of TSS. After degritting, a pretreatment process known in the art, TSS in wastewater is composed almost entirely of VSS. Most organic particles in domestic sewage or industrial food wastes will be transformed into labile carbon by bacterial action. (There will likely always be a small recalcitrant particle fraction that is not readily transformed by bacteria.) Labile carbon is BOD and has the same fate as BOD described above.

The lagoon cells reduce the concentration of TSS reaching the marsh cells by the action of grazing organisms. Reduction of bacterial biomass loading, in turn, helps preserve design hydraulic conductivity of the marsh media. Preservation of hydraulic conductivity maintains design treatment performance of the marsh cells.

Volatile suspended solids entering the marsh cells are retained on marsh root mats and media, where they are subjected to oxidation and endogenous respiration when exposed to the atmosphere. Retained VSS is also, and importantly, subject to consumption by grazing organisms; when submersed and saturated by aquatic invertebrates, and when dry by terrestrial invertebrates (see Ecological Design Elements section).

Inorganic and recalcitrant organic constituents of TSS are substantially filtered out by a sieve-type action of marsh media. Distribution of these constituents by step feed provides a large filtration area, thereby significantly retarding the tendency of the particles to fill interstitial media pore spaces. Eventually, over several years, inorganic and recalcitrant TSS are likely to accumulate on the surface of marsh media. Plants growing through accumulated TSS will tend to preserve hydraulic conductivity for vertical flow. It is expected that recalcitrant organic compound will require removal by scraping and excavation approximately once every ten years.

Aeration by tidal flux in marsh cells also provides a favorable environment for actinomycetes and fungi. Both groups are predominantly composed of obligate aerobes. Both groups excrete a wide range of enzymes that break down recalcitrant organic compounds. Populations of both groups have a high positive correlation with wetland plant roots (see Ecological Design Elements section for a discussion of plant roots). It is therefore probable that accumulation of recalcitrant organic particulates will be significantly retarded by design conditions that favor growth of actinomycetes and fungi.

The vertical flow path in the marsh beds permits some particles to migrate downward into the bottom drain collection system. In each pass through the marsh bed, a significant percentage of particles are captured on biofilm surfaces or consumed by protozoa and invertebrate organisms. Effective removals of particles takes place by multiple passes and recycle through marsh and lagoon cells.

Without the tidal flow action that periodically drains vertical flow marshes, excessive VSS would accumulate in media interstices. Excessive accumulation of VSS, in the form retained biological and organic particles, would result in unacceptable headloss and, ultimately, clogging of marsh media.

Tidal flow exposes filtered VSS to the atmosphere, ensuring drainage to near field capacity and rapid aeration. At field capacity, water is held in thin films on media and root surfaces. In thin films, diffusion of oxygen from the atmosphere is rapid. Oxygen concentration in the atmosphere is on the order of 250 mg/L, whereas in wastewater it seldom exceeds 4 mg/L. Tidal drainage of the marsh cells therefore permits aerobic degradation of VSS that is not rate limited by oxygen concentrations. Aerobic degradation is a process of endogenous respiration within biofilms and consumption of biofilms by (obligate aerobic) microinvertebrate populations. Endogenous respiration is a process whereby nutrient-starved bacteria consume cellular carbon for respiration. This process includes release of enzymes by bacteria to induce lysis of nearby cells, thereby freeing cellular carbon for respiration. High-rate endogenous respiration is induced in situations where dissolved nutrients are scarce, but terminal electron acceptors are abundant. The result of this degradation process is a high rate of in situ VSS digestion by endogenous respiration that prevents excessive accumulation of organic and biological mass within the marsh media.

Yield and Biofilms

In activated sludge systems yield is measured as mass of excess volatile suspended solids produced per mass of influent BOD and TSS. In the present system measurement of yield is not so straightforward because biofilms on marsh media and plant roots are mostly composed of bacterial growth. Excess bacterial growth in the present system is manifested in clogging of media beds as biofilms grow to substantially fill media pore spaces. A net yield of effectively zero is manifested as long-term operation of the system without substantial loss of media hydraulic conductivity.

Effective net zero yield is important for the long-term operation of the system. Draining of marsh cells and process recycle are the means to achieve effective net zero yield. Just as VSS retained in drained marsh beds is exposed to atmospheric oxygen, so are biofilms within the bed. The high dissolved oxygen concentrations within drained bed pore spaces induce endogenous respiration of biofilms concurrently with nitrification of adsorbed $NH_4^+$ ions.

Recycle of effluent also induces endogenous respiration of biofilms. The effluent BOD concentration is very low, typically less than 10 mg/L. When the volume of the final marsh cell/lagoon pair is recycled to the first cell/lagoon pair, nitrate in the first marsh cell desorbs into bulk water with very little labile carbon present. Labile carbon must then come from endogenous respiration or lysis of cells within biofilms, or hydrolysis of cellular exudates. As the slug of recycle volume proceeds throughout the system, this process is repeated in downstream marsh cells.

Draining of marsh cells and process recycle subject marsh bed biofilms to endogenous respiration conditions throughout most of any given 24-hour period. The high frequency of endogenous respiration state conditions permits a substantially higher rate of mass loading in the present system than is possible in conventional treatment wetlands. Moreover, reciprocating wetland treatment wetlands do not claim process recycle and thus may not have the same high rate of endogenous respiration.

Nitrification

Nitrification (conversion of $NH_4^+$ to $NO_3^-$) is distributed throughout the marsh cells. Nitrification takes place on biofilms within the marsh media. Nitrification is inhibited by high BOD concentrations in bulk water, but recycle and step feed distribution of influent reduces BOD concentrations in receiving lagoons or marsh cells to low values (Table 2).

Of far greater importance, however, is nitrification of $NH_4^+$ ions adsorbed onto biofilms when marsh cells are drained. There is no inhibition of nitrification by BOD in drained cells. Nitrification has been observed to be a high-rate process in drained cells.

Semipassive aeration of lagoons and recycle ensures that effluent from the lagoons flowing into the marsh cells has a system-wide, positive effect on dissolved oxygen. Tidal fill and drain aerates marsh media biofilms. The combination of receiving recycle with positive dissolved oxygen and frequent aeration of media biofilms causes nitrifying bacteria to thrive within the marsh cells. The vast surface area of the marsh media biofilms ensures sufficient nitrification to meet stringent ammonia effluent discharge standards. Ammonia effluent values are consistently observed to be substantially less than 1.0 mg/L in the pilot system of the present invention.

Lagoons also reduce BOD and TSS loading of marsh cells, which help maintain design hydraulic conductivity of marsh cells by reducing mass loading. Maintaining design hydraulic conductivity positively affects nitrification performance of the marsh cells.

Denitrification

Denitrification (conversion of $NO_3^-$ to $N_2$) occurs when bacteria use nitrate as a terminal electron acceptor to metabolize organic carbon, typically induced by anoxic or anaerobic conditions. Desorption of nitrate into bulk water when marsh cells are flooded has been observed to induce high-rate denitrification regardless of dissolved oxygen concentration.

A simple means of controlling this process is to use oxidation-reduction potential (ORP) probes to control draining of selected marsh cells. A programmable logic controller (PLC) attached to an in situ ORP probe may be used to control drainage of marsh cells. Selected cells, those receiving step feed influent, may have drainage delayed to allow anoxic conditions to develop, thereby denitrifying nitrate-rich recycle flow. The ORP probe provides information to the operator and/or PLC to drain the marsh cell before reducing conditions become strong enough to significantly stress marsh plants. In addition, regardless of ORP readings, preferably marsh cells used for denitrification should be drained periodically to promote digestion of biofilms and other biomass within the cells. Alternatively, the process recycle rate can be set to flows that induce anoxic conditions within flooded marsh cells.

Apparent simultaneous nitrification and denitrification within marsh beds substantially accounts for denitrification. Undetectable concentrations of nitrate (<0.05 mg/L) have been frequently observed in marsh drainage sumps across the entire pilot treatment system.

Pathogen Removal

Pathogens are biological particles of specific sizes (Table 7). Pathogen removal in the present treatment system relies significantly on size-specific biological particle consumption by protozoa and invertebrate grazing organisms. Most filter feeders consume whole particles suspended in open water environments. Consumption of whole particles restricts filter feeders to particles small enough to fit in their mouth cavity, but large enough to yield more energy than is expended in consumption of the particles. Therefore, a community of different populations of filter-feeding organisms is required to remove a broad spectrum of particle size classes (Table 8).

TABLE 7

Pathogen Size Classes

| Pathogen Type | Size[7] |
|---|---|
| Bacteria | 0.3–10 μm |
| Protozoan cysts | 1–30 μm |
| Helminth ova | 20–70 μm |

TABLE 8

Representative Biological Particle Consumption by Filter Feeders in Relation to Pathogen Size Classes

| Pathogen Type | Size class, μm | Filter Feeding Organism Type | Biological food article size class, μm |
|---|---|---|---|
| Bacteria | 0.3–10 | Protozoa | 0.1–2[34,35] |
| | | Rotifers | 4–17[36] |
| | | Copepods | 1–30[37] |
| | | Brachiopods | 1–50[38] |
| | | Ostracods | Est. 1–20[39] |
| | | Nematodes | Est. 0.1–20[40] |
| | | Bivalve | 1–100[41] |
| Protozoan cysts | 1–30 | Rotifers | 4–17 |
| | | Copepods | 1–30 |
| | | Brachiopods | 1–50 |
| | | Ostracods | Est. 1–20 |
| | | Nematodes | Est. 0.1–20 |
| | | Bivalves | 1–100 |
| Helminth ova | 20–70 | Copepods | 1–30 |
| | | Brachiopods | 1–50 |
| | | Bivalves | 1–100 |

Ecological Design Elements

Ecological design is an important element of the present system. Ecological design is defined here as the explicit incorporation of ecological science into the process design of the system. Critical design elements create conditions favorable to plant growth and the establishment of a robust community of protozoa and invertebrates that consume bacterial biomass.

Establishing complete plant coverage of marsh cells 12 within one growing season is important to the function of the system. Plant shoots or plugs are typically planted on a grid pattern in constructed wastewater treatment wetlands. To quickly establish complete plant coverage, the present system uses commercially available coir (coconut fiber from coconut husks having a lignin content of approximately 45%) geotextile fabric 28 with partially mature plants 29 already growing in it. Pregrowth not only ensures rapid plant acclimation to the wastewater treatment system, but also establishes an "instant" ecosystem. Pregrowth of plants 29 is done in shallow ponds where invertebrate communities quickly colonize the coir/plant matrix 28/29. Even partial coverage of the marsh cells 12 results in rapid growth of plants 29 across the entire marsh cell 12 surface. Quick establishment of plants and aquatic invertebrates is an important design element of the system.

Figure 6:
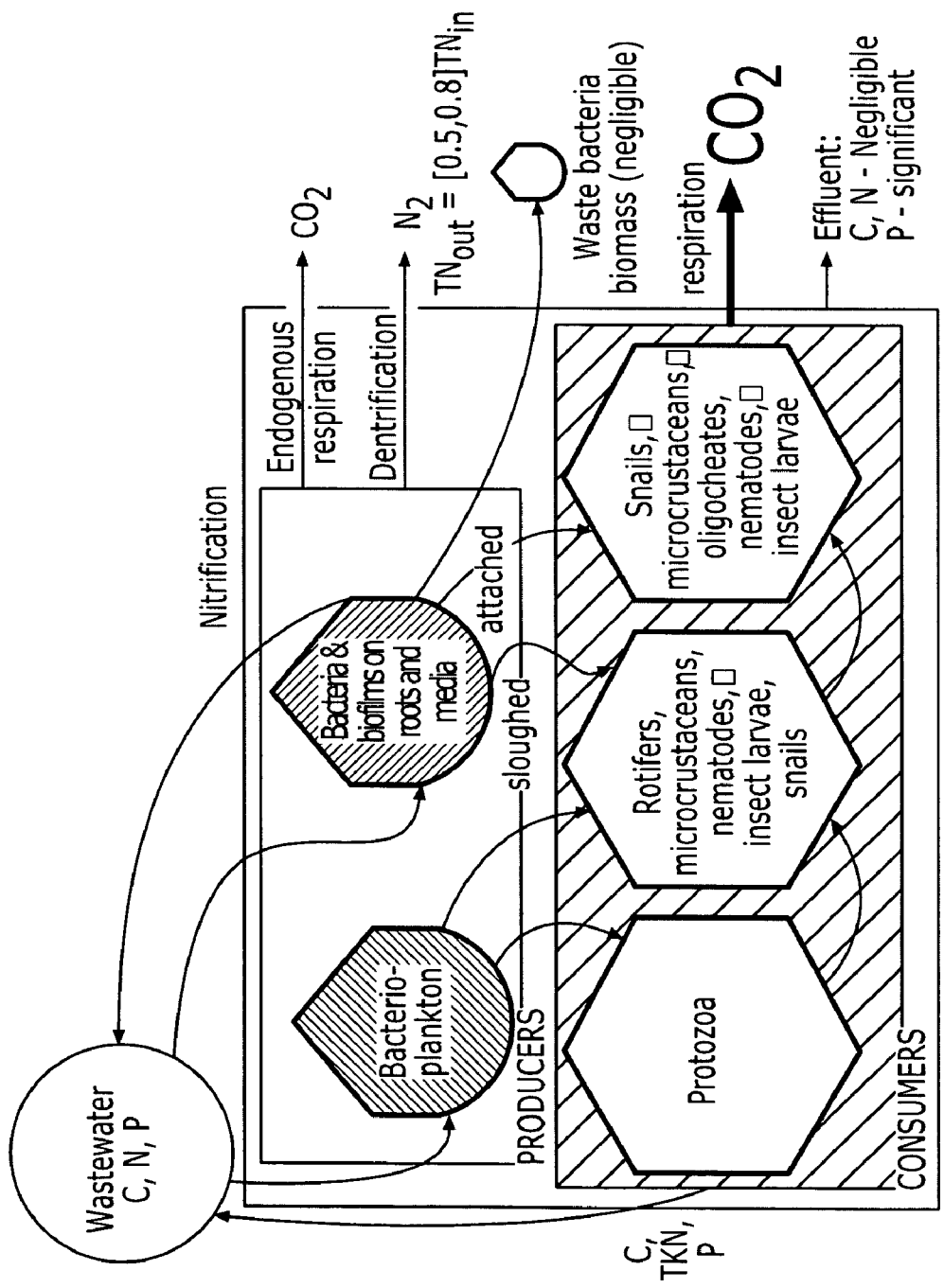
FIG. 6 illustrates a simplified trophic structure of the system of the present invention.

Knowledge of the habitat and feeding biology of aquatic invertebrates is used to inform the design of the system. The purpose of this design philosophy is to use aquatic invertebrate organisms to consume biological and organic particles present in wastewater and generated within the wastewater treatment system. Consumption of biological and organic particles by aquatic invertebrates, referred to as grazers herein, complemented by endogenous respiration of bacteria, is designed to almost entirely eliminate the need to remove biosolids (yield) from the system. Yield can be effectively eliminated because of complex webs of consumption that are based on bacterial biomass (FIG. 6). The mechanism of yield elimination is transfer of organic carbon to atmospheric $CO_2$ via respiration of invertebrates.

The community structure (i.e., the diversity, population sizes, competitive relationships, and predator-prey relationships of constituent species) of these grazing organisms is self-organizing and can be highly complex, but is controlled by large-scale mechanisms.[18] The large-scale mechanisms are the engineering design elements. Most of these ecological engineering design elements have been previously described. This section will explain the ecological design importance of those descriptions and introduce new ecological design concepts.

Functional Classification of Grazers

Grazers are composed of a diverse assemblage of taxonomic types. Within the present system a functional classification of grazers is far more important than a zoological taxonomic classification. Grazers can be classified by their feeding ecology, placing them in two fundamental categories: filter feeders and detritivores.

Filter feeders consume particles suspended in water and typically inhabit open water environments. As discussed above, most filter feeders consume whole particles that are small enough to fit in their mouth cavity, but large enough to yield more energy than is expended in consumption of the particles. Therefore, a community of different populations of filter-feeding organisms is required to remove a broad spectrum of particle size classes.

Detritivores are adapted to consume biofilms and accumulated organic matter located on some physical substrate, such as media or roots. Detritivores are equipped with jaw parts capable of processing their food source into pieces small enough to ingest.

There is overlap between filter feeders and detritivores, particularly in juvenile stages. However, the ecological niches these respective grazing communities fill are sufficiently distinct in both treatment function and design requirements to be useful classifications. Both functional types of grazers inhabit the entire system in use. Filter-feeder populations will dominate lagoon grazer ecology. Detritivore populations dominate marsh grazer ecology.

Ecological Design of Lagoons

There are two ecological design elements of lagoons in the system that are important to designing a stable filter-feeder community: aeration (either passive or active) and rafted plants. To a lesser, but important extent, step feed is an important ecological design element. These three design elements and their effects are described below.

Transfer of oxygen to bulk water is sufficient to maintain the positive dissolved oxygen concentration that is essential if lagoons are to maintain populations of grazers, especially filter-feeding zooplankton. The design means of ensuring sufficient oxygen transfer will be site specific. In some cases, tidal turnover of the water column in lagoons will be sufficient. In others, supplemental mechanical aeration will be required. Regardless of how oxygen transfer is accomplished, the effect on treatment of maintaining positive dissolved oxygen concentrations in the lagoons is profound. Because there is no clarifier recycling settled biosolids to the lagoons, unicellular bacterial or algal dominate biomass conversion of wastewater nutrients. Filter feeders consume a large fraction of the bacterial or algal biomass produced in each pond, thereby reducing yield and particulate loading of the downstream marsh cell.

Lagoons are equipped with rafted plant racks that permit plant roots to grow into the water column while keeping leaves and stalks above water. The types of plants used may vary to suit local conditions, but marsh plant species are most likely to thrive in the lagoon environment. Coverage by plants reduces yield by a variety of mechanisms, as described below.

If climatic conditions permit, floating aquatic plants having long roots, such as *Eichornia crassipes* (water hyacinth) and *Pistia stratoides* (water lettuce) can be used in place of rafted plants. Careful design consideration must be given, however, to the need to regularly harvest these fast-growing plants. Rafted emergent wetland plants are believed at present to comprise the preferred embodiment.

Shading by plant rafts reduces production of algae. In combination with short lagoon hydraulic retention times (<1 day) and the partial mixing provided by tidal flows, neither sun- nor shade-loving algae are provided with ideal growth conditions.

Plant root zones harbor detritivores, sessile filter feeding, and free-swimming communities of grazers. Plant roots significantly enhance grazer community diversity. Inclusion of habitats for both functional grazer types permits grazing intensity across a greater spectrum of biological and organic particles, both present in wastewater influent and generated within each lagoon.

Plants provide refuge against predation and low-oxygen events. The plant root zone is a kind of thicket in which prey can hide from predators. All grazers have predators. Not all predators are useful for particle removal.

Low-oxygen events may be caused by an organic overload or a power loss in aerated systems. Massive die-off of plankton during low-dissolved-oxygen events is a common observation in eutrophic water bodies. Aeration can prevent such a die-off, but plants can provide alternative protection mechanisms for some species of zooplankton. Certain zooplankton types (e.g., copepods) and detritivores (e.g., snails) are able to position themselves at the water-air interface on plant roots and thatch during anoxic events in the bulk water volume. By maintaining coverage with a thin film of water, these grazers are able to use atmospheric diffusion of oxygen to respire while preventing desiccation. When aerobic conditions are restored, these grazers migrate back into the root zone and open water. Die-off is thus mitigated. In contrast, an open water surface without rafted plants provides no means for these organisms to escape anoxic conditions of the bulk water volume. The result is massive die-off of grazer populations.

Therefore, plants form an essential refuge that assists biological particle size management by grazers. Stabilization of grazer populations by plant roots is important. Without stable grazer populations yield reductions cannot reliably take place within the lagoons of the system.

Plants help control populations of filamentous bacteria. The aerated lagoons tend to favor growth of unicellular bacteria. However, intensive grazing of unicellular bacteria by filter-feeding zooplankton may provide a competitive advantage for growth of filamentous bacteria. The reason for this advantage is that filamentous bacteria are not easily ingested by many filter-feeding zooplankton. If the grazing rate of unicellular bacteria is very high, and that of filamentous bacteria very low, then filamentous bacteria can escape competition for wastewater nutrients. Filamentous bacteria, however, tend to clump under high population densities. Plant roots tend to sweep and hold clumps of filamentous bacteria. Detritivores inhabiting roots have jaw parts enabling them to consume the filamentous bacteria. Thus coverage by plants with large masses of roots tends to provide a dynamic regulatory mechanism for filamentous bacteria.

Step feed with recycle affects both aeration and rafted plants. The lagoons are partially mixed. Supplemental aeration may be needed in some cases to maintain positive dissolved oxygen concentrations. The large dilution ratios provided by step feed with recycle substantially reduce the volumes of air needed to maintain positive dissolved oxygen. Reducing the required aeration air volume then reduces the turbulence induced by aeration. Plant roots tend to grow longer and are better distributed in an inverse relationship to turbulence.

Step feed with recycle also induces plants to grow longer roots. Root length tends to be inhibited by ammonia concentrations in excess of 5 mg/L. Step feed with recycle can reduce influent TKN concentration to values close to 5.0 mg/L (Table 2). Influent ammonia concentrations will be lower because much of influent TKN is composed of organic nitrogen rather than ammonia. Therefore, plant roots in the lagoons tend to extend a significant distance into the water column. These large root masses support grazer communities that reduce yield in lagoons.

Inhibition of cyanobacteria (blue-green algae) growth is an important effect that emerges from step feed, partial mixing, tidal fluxes, and stabilization of grazer communities. Cyanobacteria can produce toxins harmful to invertebrate grazers and vertebrates, including humans, that come in contact with or drink water where large cyanobacteria blooms are present. Cyanobacteria are undesirable in wastewater treatment lagoons, but are commonly present and can form dense mats on the lagoon surfaces if not controlled.

Cyanobacteria favor conditions of high nutrients, persistent habitats, light limitation brought on by self-shading, and a stable water column. Mixing inhibits growth of cyanobacteria by turning over the water column and limiting self-shading. (Self-shading is not the same as shading from a plant raft, because mixing prevents a stagnant, shaded zone from forming under the raft. Self-shading is a phenomenon of excessive turbidity brought on by high concentrations of biological particles.) Tidal fluxes induce periodic habitat instability. Step feed keeps influent nutrient concentrations relatively low. A stable grazing population prevents build-up of excessive concentrations of biological particles that would shade the water column and produce conditions favorable to growth of cyanobacteria. Grazing has been observed to inhibit growth of cyanobacteria by maintaining water clarity.

This system of physical, biological, and ecological elements prevents build-up of cyanobacteria populations. These system effects ultimately enhance process stability of biological particle removal because cyanobacteria are poor food sources for grazers. Control of cyanobacteria provides stability of the particle removal function of grazers.

Ecological Design of Tidal Vertical Flow Marshes

Important ecological design elements of marsh cells 12 include frequent aeration of marsh media and plant root zones by tidal water flux, use of a media favorable to root penetration, use of coir matting to establish plants, and periodic partial inundation of emergent aquatic macrophytes. Emergence of a stable and diverse grazer community is an intentional system effect of these design elements. To a lesser extent step feed is an important ecological design element. These ecological design elements and their effects are described below.

Tidal fluctuation in marsh cells draws air though roots and into marsh media. The high concentration of oxygen in air aerates the root and media zone. The effects of periodic aeration are profound:

1. Aeration promotes nitrification of wastewater ammonia absorbed on biofilms and media;
2. Prevention of persistent anaerobic conditions in marsh soils (media in this case) significantly enhances plant species diversity;
3. Plant growth is favored by periodic aeration of marsh soils;
4. Enhanced species diversity and plant growth promotes dense standing vegetation;
5. Dense standing vegetation provides large surface areas that are habitat and refuge for a diverse and large community of grazers;
6. Increased plant growth promotes the formation of a thick, permeable root mat;
7. Increased plant growth provides large surface areas for biofilms to form during the flooded phase of the tidal cycle; treatment surface area is thereby increased in the marsh cells;
8. Marsh influent passes through standing vegetation and the root mat; particles retained on plant surfaces are subject intense grazing pressure;
9. Aeration of media prevents excessive build-up of bacteria biomass that could cause unacceptable headloss (as can be determined from the long-term persistence of design hydraulic conductivity in recirculating sand and gravel filters); and
10. Aeration of media promotes grazing of bacterial biomass that would tend to accumulate within media interstices. High population densities of grazers have been documented in aerobic sand. There is no fundamental difference biologically in aerobic sand or larger aggregate.

As disclosed above, the marsh cells contain a lightweight aggregate, preferably made of expanded shale. The bulk density of this aggregate is approximately 55 lbs/ft$^3$. The low bulk density combined with an effective porosity of approximately 40% promotes penetration of roots deep into the media. Expanded shale aggregate is used as a rooting medium in the hydroponic horticulture industry. In contrast, standard aggregates used in conventional horizontal subsurface flow marshes tend to inhibit significant root penetration. Deep penetration of roots into marsh cell media positively affects populations of ciliated protozoan communities that feed on unicellular bacteria.

The media surface of the marsh cells is substantially covered with coir matting, and plants are installed or seeded within this coir mat. The coir mat promotes quick rooting in a horizontal direction, and is an excellent medium for sprouting and growing seeds. Coir mat also acts as a litter, or detritus, layer prior to the accumulation of plant litter. Like a litter layer, the coir mat provides a moist surface layer in which detritivores find abundant food, habitat, and refuge from predation and environmental upsets. Overall, the coir matting is important in quickly establishing a marsh treatment ecosystem.

Periodic, partial tidal inundation of the marsh plants is important to establish a diverse and large community of grazers. The plant/coir/media combination supports a large detritivore community as well as a free-swimming filter feeding community. When the marsh is drained, aquatic detritivores and filter feeders find refuge in the coir mat, roots, and moist lower thatch. Terrestrial detritivores may feed at the marsh surface while the marsh cell is drained, but find refuge from drowning while the cell is flooded by crawling up plant leaves and stalks. When the marsh cell is flooded, free-swimming filter feeders emerge from the root/coir mat to feed on suspended bacteria. Aquatic detritivores are free to feed on surfaces in the flooded zone.

Tidal flooding and draining therefore provide a variety of ecological niches for grazers to exploit. In nature, tidal freshwater wetlands are known to have abundant and diverse populations of grazers because of this variety of niches. In the present system, the abundance and variety of grazers translates to removal of VSS by the grazer community.

Step feed and recycle have important effects on the ecology of the marsh cells. Recycle and step feed create a relatively weak marsh influent. The weaker influent causes a gradual, rather than rapid, onset of anoxic conditions within the marsh media during the flooded phase. Some grazers, including protozoa, nematodes, and rotifers, which typically inhabit media interstices and surfaces can withstand anoxic conditions of short duration or will migrate along oxygen gradients to higher dissolved oxygen concentrations. Others, such as snails and copepods, can migrate to plant surfaces in contact with the atmosphere to obtain oxygen by diffusion. Rapid onset of anoxic conditions creates longer periods of exposure to anoxia for less motile grazers and less time for a behavioral response to anoxia by highly motile grazers. The treatment result here is clear: maintenance of stable grazer populations that consume VSS.

A system effect of step feed emerges from tidal aeration of marsh cells and enhanced growth of plants. As previously stated, step feed promotes gradual onset of anoxic conditions within the marsh media. Plants are therefore minimally stressed by anoxia in the tidal cycle, contributing to the effects of periodic aeration noted above.

The large plant surface area in contact with water during the flooded phase of the tidal cycle is colonized by photosynthetic biofilms known as periphyton. Periphyton is sensitive to drying, but in a thick plant thatch much of it remains moist during the drained phase of the tidal cycle. During the flooded phase, periphyton oxygenates the free water above the media and roots. The tendency of bacterial respiration to remove oxygen from water is then counterbalanced in daylight by photosynthetic oxidation of the water column by periphyton. Large numbers of grazers have been observed swimming during the flooded phase while there are anoxic conditions in the media. Further observation reveals apparent significant production of oxygen bubbles from periphyton within the marsh cell. Grazers may consume VSS for longer periods, if not throughout, the flooded phase of the tidal cycle. Step feed therefore can be said to have significant emergent ecosystem effects that enhance removal of VSS from the treatment system.

Oxygenation by periphyton is especially important during periods of passive flow or delayed drainage. Establishing anoxic conditions for denitrification and positive dissolved oxygen concentrations to maintain grazer populations appear to be mutually exclusive functional requirements. However, simultaneous photosynthetic oxygen transfer promotes a positive dissolved oxygen concentration in the flooded free water surface while bacterial respiration in the media drives interstitial water to negative ORP values.

Lagoon-Marsh Interactions

The lagoon and marsh cells form an integrated treatment system. Some interactions between lagoon and marsh cells have already been described. Other interactions emerge from the ecology of grazers.

Important process interactions that have been previously mentioned are summarized below:

1. Each lagoon cell reduces BOD and particulate loadings of the immediately adjacent and downstream marsh cell.

2. Reduction of BOD and particulate loading of marsh cells maintains design hydraulic conductivity of marsh media.

3. Maintaining design hydraulic conductivity of marsh cells preserves design nitrification performance.

4. A consequence of these process interactions is that the ammonia concentration profile in lagoons cells decreases across the entire treatment system. Decreasing ammonia concentrations protect grazers from ammonia toxicity.

5. The unique lagoon-marsh configuration of the system also has profound effects on the removal of biological particles: rapid recolonization of marsh cells by grazers and long-term stabilization of grazer particle removal performance.

There will be events within the long-term operation of the system that result in local extinction of certain grazer populations. Power outages, resulting in prolonged drying or inundation, or drying of a marsh cell for maintenance are two potential examples of such events. The grazer refuge of the lagoon cells is inherently robust because of the rafts. Diverse populations of filter feeders and detritivores can find refuge over prolonged period of anoxia (such as might occur during power outages). Some of these grazer populations will flow downstream to the next marsh cell and rapidly recolonize it, thereby reversing any degradation in biological particle removal performance.

Stabilization of long-term biological particle removal is a relationship between the ecology of biological particle growth, the sieving action of the marsh media/root bed, and the feeding ecology of grazers.

Grazing by filter feeders in lakes produces a disjunctive phytoplankton size distribution with size classes of <50 $\mu m^3$ (d=4.6 $\mu m$) and >$10^4$ $\mu m^3$ (d=57.3 $\mu m$). This disjunctive distribution reflects the abundance and food size preference of microcrustacean filter feeders, principally copepods and branchiopods. The present system produces biological particles comprised mostly of bacteria, not phytoplankton. However, the effect of grazing pressure on particle size class distribution is likely to be disjunctive as well. Bacterioplankton size class distribution will tend to follow this distribution. Bacteria flocs in excess of 50 $\mu m$ in diameter will tend to escape predation by most classes of filter feeders. (Bivalves tend to have very specific habitat requirements that cannot often be met in wastewater treatment design. Algivorous fish can consume larger particles, but for a variety of reasons are often not a useful part of wastewater treatment.)

This biological particle disjunctive size class distribution is a problem for treatment systems comprised of only lagoons in series. Grazing by filter feeders releases the large sizes of algae from nutrient competition. Shading by large algae ultimately leads to dominance by cyanobacteria, which are resistant to grazing. Attempts have been made to control large species of algae by using algivorous fish. These fish sieve water through gill rakers that can effectively filter particles larger than 10 $\mu m$. Also sieved from the water are zooplankton that would normally consume smaller algae. The result of using fish to control algae is to establish populations of small-diameter algae largely freed from predation, resulting in shading and ultimate succession of cyanobacteria populations. An effective solution to this problem is alternation in series of lagoons stocked with algivorous fish and lagoons without fish.[28] This system of alternating lagoons has been documented to remove 99% of phytoplankton as measured by chlorophyll a concentration, but is still considered experimental. Fish and Game regulations in much of the United States severely restrict use of this ecotechnology because fish species useful for this application are exotic to North America.

The present system controls particle size distribution by sieving large particles in the marsh cells. Particles greater than 50 $\mu m$ in diameter are effectively filtered by vertical flow marsh cells, where they ultimately degrade or are consumed. Smaller particles are consumed by filter feeders in lagoon and marsh cells. Biological particle size classes over approximately 0.1 $\mu m$ are subject to predation or filtration.

The alternation of lagoon and marsh cells that contain diverse and stable populations of grazers is an effective way to remove biological particles from the treatment system. Stable control and removal of biological particles not only produces low effluent TSS concentration, but also helps prevent clogging of marsh beds, thereby preserving the design hydraulic conductivity that is important to process design.

CONCLUSIONS

The system and methods of the present invention are believed to form a significant improvement over existing wetland and lagoon wastewater treatment technology. Combined lagoon and wetland treatment systems do exist, but all these treatment wetlands appear to serve as polishing systems for lagoon effluent. None uses lagoons as a means to enhance wetland treatment performance. None uses alternating lagoons and wetlands in series. None uses vertical flow tidal wetlands. None uses explicit ecological design principles to optimize any element of process or hydraulic design.

Improvements to the prior art have been explicitly or implicitly described previously, but will be reiterated or expanded upon below. Because the hydraulic design of the system is unique, and has profound effects on treatment, this section is divided into subsections: Hydraulic Improvements and Process Improvements.

Hydraulic Improvements

Introduction of wastewater into lagoon cells and vertical flow in marsh cells helps resist headloss in marsh media by inorganic fines. Some inorganic fines will inevitably be carried by influent wastewater into the system. Influent enters lagoons by step feed. Because the lagoons are partially mixed, inorganic fines will tend to settle out and not enter the marsh cells. Hydraulic conductivity is thus protected in the marsh cells. Extremely small inorganic fines that are carried into the marsh cells are able to migrate vertically downward through the relatively larger interstices of the marsh media and be carried out of the marsh cells. Clogging of wastewater treatment marsh by inorganic fines is thus prevented by the design of the system.

Very few vertical flow wetland designs in use have a tidal hydraulic flow regime. No tidal vertical flow wetland designs known have a gravity flow-through hydraulic. It is true that for tidal flow to occur, some kind of gravity or mechanical drain is necessary. By definition, a constant water level is not tidal. However, when tidal flow is considered within the context of an integrated system of marsh treatment cells, passive (gravity) forward flow of continuous level through VF marsh cells may occur in part of the treatment system while tidal flow occurs in other parts, or passive forward flow may occur in the entire treatment system for a transient period between tidal flow events. No other tidal or vertical flow treatment system is known to have this type of flow regime.

A major disadvantage of a purely reciprocating flow design is that pumping must occur to induce downward vertical flow. The same is true for existing experimental VF wetland tidal series design. When obligate pumping is required for all vertically loaded components of the treatment system, downward vertical forward flow through wetlands is lost when pumping is lost. Tidal fluctuation for wastewater process design is important, as discussed below. However, in these designs hydraulic and process design are tightly coupled because pumping is required for treatment to occur. Pumping and process cannot be decoupled. As a result, these systems cannot respond as effectively to fluctuations in hydraulic loading.

The capacity for passive forward flow provides significant hydraulic advantages:

1. Passive forward flow partially decouples process and hydraulic design. Some treatment processes may require only occasional tidal fluxes or fluxes over long periods (see Process Design section). Passive forward flow therefore provides process and operational flexibility that obligate pumping does not. Passive forward flow also saves electrical and equipment maintenance costs.

2. Passive forward flow is needed for practical application of tidal marsh technology. Municipal wastewater or surface water runoff treatment systems typically receive surge flows regardless of the type of collection system used. Wastewater treatment plants therefore must be designed to accept surge or peak flows. An obligate pumping system must provide surge pumping capacity and surge basins to avoid overflow events. In contrast, passive forward flow through VF marsh cells and lagoons provides inherent surge capacity within a treatment system without the need for additional surge basins or surge pumping capacity. An integrated treatment system of the present invention need only have total treatment volume capacity sized to accept design surge or peak flows, as is current practice in wastewater engineering design.

The integration of lagoons into VF marsh treatment systems provides cost-effective surge capacity. If surge capacity is entirely taken up in marshes, marshes must be oversized in surface area because marshes are restricted in depth. Larger surface area entails the additional capital expenses of larger distribution and underdrain systems, more excavation, greater land use with associated real estate costs, larger volumes of marsh media, and increased planting costs. Lagoons, in contrast, can be excavated deeper, to accept surge flows. Every three feet of depth (0.91 meters), for instance, in a one-acre (0.41 hectare) lagoon will hold one million gallons (3,785 cubic meters).

Free water surfaces in marsh cells create surge capacity. Marsh aggregate media typically has pore a volume that is approximately 40% of the bulk media volume. Designing in a free water surface into the marsh permits retention of 326,000 gallons per acre-foot. Because ecological process design (see below) permits operating free water surface depths of two feet, and transient free water surface depths up to four feet, each acre of marsh can accept over one million gallons of surge capacity in free water surface alone. All this surge capacity will operate with passive forward flow if needed until normal tidal flow operating conditions are resumed.

Step feed is an important improvement on hydraulic design of wetland treatment systems. Step feed has already been established as a critical part of the design of water hyacinth wastewater treatment lagoons, but does not appear to be part of the design criteria for wastewater treatment wetlands, which typically employ a plug flow design. No known tidal vertical flow wetland designs has used a step feed design. Because step feed has such profound effects on process design, as previously described, it is not believed to be a mere engineering improvement.

Finally, important improvements to hydraulic design are the mechanisms for inducing endogenous respiration. Monjeau taught flood and drain in his 1901 patent (U.S. Pat. No. 681,884) for water treatment, a process subsequently used by others for wastewater treatment. Explicit means to induce endogenous respiration is not taught in the flood and drain literature, but can be inferred in light of current knowledge as an element of prior art in flood and drain wetland design. Behrends is most clearly aware of processes that affect endogenous respiration in his discussion of reaeration of biofilms, but does not teach process recycle of final effluent to the initial treatment cells. The combination of tidal flux in marsh cells and recycle of effluent that is essentially free of labile carbon to the front end of the system of the present invention induces a higher rate of endogenous respiration than by drainage alone.

Process Improvements

Process improvements to the existing art of wastewater treatment technology are described below.

Oxygen Transfer and Energy Efficiency

As discussed earlier, nitration in the present system can reduce bulk water oxygen demand by 20–50%, depending on the influent COD:TKN ratio. The remaining bulk water oxygen demand is met semipassively from atmospheric diffusion during the tidal flood and drain cycles.

The energy efficiency of oxygen transfer in the present system is a significant improvement over prior art in wastewater treatment systems capable of meeting a total nitrogen effluent concentration of $\leqq 10$ mg/L, that is, substantially complete nitrification and denitrification processes. A comparison of energy efficiency is necessarily approximate because of the inherent variation in wastewater treatment design, but even approximate comparisons are revealing, as discussed below.

A 500,000-gpd extended aeration, fully nitrifying treatment system (treating municipal effluent at average BOD and TKN) for municipal wastewater with 15-ft-deep detention basins and 24 hours hydraulic retention time will have an air demand for mixing and treatment of approximately 2500 actual cubic feet of air per minute delivered at approximately 8 psig. A blower of approximately 60 to 80 horsepower is required for this air demand and pressure. The variability in power requirements is a function of several considerations, such as blower motor efficiency, altitude, air temperature, air piping design, and diffuser design.

A 500,000-gpd system of the present invention requires an approximate continual design pumping rate of 500,000 gpd+8×500,000 gpd=4,500,000 gpd (3,125 gpm). This continual pumping rate is equal to the maximum pump horsepower requirements at any given moment in the treatment system. An axial or mixed flow propeller pump of 20 horsepower has a capacity of 5,000 gpm at a total head of 12.5 ft. Therefore, the present system can provide advanced tertiary treatment at approximately one-quarter to one-third of the power requirements of activated sludge treatment systems.

A similar comparison can be made with aerated lagoons. Crites and Tchobanoglous (Ref. 3, pp. 543–44) laid out the aeration and power requirements for a 5-cell, 400,000-gpd aerated lagoon treatment system providing secondary treatment of BOD. The residence time is 11.8 days. The aeration power requirement for the first cell is approximately 20 horsepower. There is insufficient treatment performance requirements information in their presentation to calculate the power requirements for the remaining cells. However, taking the flow up to 500,000 gpd and requiring partial mixing in all lagoons gives an aeration power requirement of at least 50 horsepower. The present system provides much better treatment than aerated lagoons at approximately 10% of HRT and 50% of power requirements than the aerated lagoon example presented by Crites and Tchobanoglous.

The Tennessee Valley Authority reciprocating wetland system of Behrends (U.S. Pat. No. 5,863,433) teaches an oxygen transfer that is inherently limited by subsurface flow. The lack of open water surfaces in lagoons and wetland cells reduces the surface across which air can diffuse by a factor determined by media porosity. This reference gives measured oxygen transfer rates of 0.53 to 2.12 g $O_2/m^2$/day. In contrast, in the present invention, calculated oxygen transfer rates of 7.5 g $O_2/m^2$/day (Eq. 5) fit stoichiometric requirements of observed treatment performance and effluent dissolved oxygen concentration. The difference between the two oxygen transfer rates is significant. Given an effective media porosity of 30% used by Behrends, a multiplication of his values by 3.33 to account for loss of surface area would bring his results to 1.76–7.05 g $O_2/m^2$/day. These values are close to observed transfer in the present system, which has effectively three times the surface area for oxygen transfer than does the Behrends system.

The lower areal oxygen transfer rate in the Behrends system therefore requires substantially more pumping than for the present system if all other values are held equal. Behrends teaches most preferred limits for reciprocating cycles as 2.0–4.0 hours with a greater operating range of 0.10–24.0 hours. These reciprocating cycle rates are with a system HRT most preferably of 2.0–4.0 days within a greater operating HRT of 0.1–80 days. In contrast, with the present invention, within 2.0–4.0 hour flood and drain cycles, an HRT of approximately 1 day is needed to achieve advanced tertiary treatment from high-strength wastewater influent of $BOD_5$=300 mg/L and TKN=45 mg/L. Substantially higher wastewater influent strengths have been tested without significant variation in treatment performance. Because oxygen transfer is critical to treatment rates and because the Behrends system limits oxygen transfer by subsurface flow, the most logical explanation for the improved treatment performance of the present invention over the Behrends system is improved oxygen transfer rates over free water surfaces in the present system that are absent in the Behrends system.

Tanner et al.[32] conducted flood and drain wetland treatment studies in which care was taken to minimize transfer of oxygen across free water surfaces. The treatment performance of the Tanner study was substantially inferior to that reported by Behrends or observed in the present invention (Table 9). Thus a clear hierarchy of the importance of optimization of free water surface for oxygen transfer can be established. The present invention maximizes free water surfaces, and hence atmospheric oxygen transfer to bulk water, and has the best observed treatment. Behrends' invention has reduced atmospheric oxygen transfer to bulk water because of subsurface flow and has treatment inferior to the present invention for the same HRT and the Tanner study that intentionally minimized atmospheric oxygen transfer to bulk water and had treatment substantially inferior to that reported by Behrends.

TABLE 9

Comparison of TVFM with TVA (Behrends), Tanner, and Sun treatment performance for BOD < COD, and TN (mg/L)

|  | TVFM | TVFM | TVA | TVA | TVA | TVA | Tanner | Tanner | Sun | Sun % removal |
|---|---|---|---|---|---|---|---|---|---|---|
| HRT, days | 1 | 1 | 1 | 1 | 8 | 8 | 7 | 7 | 4 | 4 |
| $BOD_{in}$ | 376 |  | NR |  | NR |  | 528 |  | 1100 |  |
| $BOD_{eff}$ | <4.0 | 98.9% | NR |  | NR |  | 9.5 | 98.2% | 26 | 97.6% |
| $COD_{in.}$ | 1072 |  | 2500 |  | 2500 |  | 605 |  | 1465 |  |
| $COD_{eff}$ | <10 | 99.1% | 1053 | 57.9% | 72 | 97.1% | 142 | 76.5% | 71.3 | 95.1% |
| $TN_{in}$ | 26 |  | 27 |  | 27 |  | 111 |  | 334.8 |  |
| $TN_{eff}$ | 3.2 | 87.7% | 2.65 | 90.2% | 2.35 | 91.3% | 45.7 | 58.8% | 207.3 | 38.1% |
| $TSS_{in}$ | <50 |  | NR |  | NR |  | 160 |  | 667 |  |
| $TSS_{eff}$ | 5 | ~90% | NR |  | NR |  | 19 | 88.1% | 118 | 82.3% |

Sun[33] is closer to Behrends in performance, but Sun's total nitrogen treatment performance suffers from system hydraulics that do not appear to provide sufficient carbon for denitrification. As described earlier, Sun's system does not include step feed or recycle of effluent to the first treatment cell. Consequently, nitrification is favored over denitrification. The lack of denitrification in Sun's system clearly impairs energy efficiency. After four days of residence time Sun reported an effluent nitrate concentration from the tidal wetland cells of 182.4 mg/L. Assuming a 95% consumption of nitrate, such as observed in the present system, the nitrate produced in Sun's system could have consumed approximately 500 mg/L of COD, or about one-third of influent COD. The present system thus appear to have substantially greater energy efficiency than the system reported by Sun.

BOD Removal

Removal of BOD in lagoon and marsh cells occurs at a much higher rate than conventional treatment wetlands because of semipassive oxygen transfer mechanisms (nitration and aeration) described above. Moreover, these semipassive processes eliminate in most cases the need to aerate the lagoon component of the present system to maintain a positive lagoon dissolved oxygen concentration that would otherwise be required in conventional aerobic lagoons in series. Step feed and recycling also reduces BOD loading, promoting positive dissolved oxygen levels that enhance BOD removal.

Nitrogen Removal

Nitrification takes place in the marsh beds to produce effluent ammonia concentrations less than 1 mg/L. An important mechanism for nitrification is absorption of $NH_4^+$ ions onto marsh media and media biofilms during the fill phase and nitrification of ammonia ions in contact with atmospheric oxygen after the marsh cell has drained. Biofilms in marsh beds can nitrify because tidal cycling can be manipulated to produce positive dissolved oxygen concentrations in all marsh media beds several times per day. Oxygen transfer from the atmospheric and photosynthetic processes in lagoons and flooded marsh cells also assist nitrification in marsh media beds.

Tidal cycling can be manipulated to produce transient anoxic conditions in marsh beds that promote a high degree of denitrification. In particular, the passive forward flow mode is highly effective at denitrifying nitrified process recycle.

No other conventional wetland treatment system provides the same level treatment and operational flexibility in nitrification and denitrification processes.

Treatment Comparison of the Present System with Other Tidal Flow Systems

The treatment performance of the present treatment system represents a substantial improvement over the prior art in flood and drain (tidal) treatment wetlands. Removal of BOD or COD is substantially improved over the Behrends system and systems reported by Tanner and Sun. The difference in treatment performance can be attributed in part to improved transfer of atmospheric oxygen across lagoon and marsh free water surfaces. Process recycle of effluent to the first marsh cells also appears to improve denitrification. Additionally, step feed distributes instantaneous mass loading to all cells, and recycle significantly raises DO concentration and OPR potential in marsh cells.

Energy Efficiency

As described earlier in the nitration and aeration section, the present system is at least twice as energy efficient as an activated sludge system providing advanced tertiary treatment and about twice as efficient as aerated lagoons systems providing secondary treatment. Energy efficiency appears to be substantially greater than Behrends' system because of the greater oxygen transfer rates in the present system. Energy efficiency over the Sun and Tanner systems is less clear, but is somewhat of a moot point because the treatment performance of both systems is substantially poorer than either Behrends or the present system.

Yield and Endogenous Respiration

The combination of drain and fill with effluent recycle to the first treatment cells enhances promotes a high level of endogenous respiration of marsh bed biofilms and entrapped VSS. The degree of endogenous respiration promoted results in a net annual effective yield of zero. Net effective yield of zero in turn maintains hydraulic conductivity of marsh cells.

Footprint

The treatment footprint is one-quarter to one-half of conventional treatment wetlands. The smaller footprint is made possible principally by mechanical aeration of lagoon cells and/or aeration of marsh cells by tidal fluxes.

Effective Integration of Lagoons and Marshes

No other treatment system employs alternating wetlands or lagoons in series. In combination with step feed, recycle, semipassive aeration of lagoon cells, vertical flow in marsh cells, and tidal fluxes, the alternating lagoons and marsh system optimizes the BOD removal capacity of lagoons, the biological particle removal capacity of both lagoons and marsh cells, and the nitrification/denitrification capacity of marsh cells.

Step Feed

Step feed is not common in conventional wastewater treatment wetland designs. Use of step feed in lagoons cells that alternate with marsh cells is unique. Step feed used in this manner is an effective means of distributing influent mass loading in a way that uses lagoons cells as pretreatment unit processes for marsh cells. Step feed promotes the long-term maintenance of the design hydraulic conductivity of marsh cells.

The use of step feed in tidal flow design prevents clogging of the first marsh cell. Distribution of mass and hydraulic loading increases design efficiency because a single receiving cell does not limit system loading.

Ecological Design—Grazers

The ecology of grazers, both filter feeders and detritivores, has well-defined requirements to promote the establishment of stable communities. Grazer communities consume not only the spectrum of biological and organic particles present in wastewater, but also biofilms and other accumulations of bacteria and algal biomass.

No wastewater or lagoon wastewater treatment technology explicitly integrates ecological design principals into process and hydraulic design. Consumption of bacterial and algal biomass by grazers in the present treatment system affects treatment in profound ways:

1. In conjunction with endogenous respiration, bacterial yield is effectively eliminated;

2. Head loss in marsh cells is effectively resisted because accumulation of bacteria or algal biomass is checked by detritivores;

3. Algal biomass loading of marsh cells from lagoon cells is effectively checked by filter-feeding grazers;

4. The size class distribution of biological particles is managed by the combined action of grazer communities and the sieving action of marshes;

5. Pathogens in the size classes of 0.3–50 µm are heavily grazed by filter feeders in marsh and lagoon cells, thereby reducing the numbers of these pathogens prior to disinfection.

Ecological Design—Plants

Plants are used in the present system to create an environment that establishes a stable community of grazing organisms in both lagoon and marsh cells. The treatment role of plants is therefore indirect, but fundamental to the treatment process. In many treatment wetland designs, and in particular horizontal subsurface flow wetlands, plants have little discernable effect on treatment.

Plants are also used in the present system in ways that are positively correlated with treatment effectiveness:

1. Plants are positively correlated with improved treatment over unplanted flood and drain marsh cells.

2. Direction of flow is substantially downward vertically through a highly porous horizontal root mat and media in the direction of most root growth. Plants are therefore positively correlated with hydraulic conductivity, unlike horizontal subsurface flow wetlands.

3. Periodic inundation of plant thatch provides a rich environment for grazer communities and oxygen producing periphyton. Thick growth of plants is therefore positively correlated with treatment effectiveness, unlike surface flow wetlands.

4. Aeration by tidal fluxes, aeration of upstream lagoons, step feed, and recycle combine to prevent persistent anaerobic soil conditions in marsh cells, and especially sulfide toxicity, that heavily stresses plants. Conventional treatment wetlands typically have highly anaerobic soil conditions that stress plants.

5. Use of lightweight aggregate soil promotes growth of plants deep into the marsh media bed, thereby increasing microbial diversity and the populations of protozoan grazers of unicellular bacteria.

6. Use of coir matting on media surfaces not only provides an idea medium to establish plant plugs and sprout marsh plant seeds, but also provides the functional equivalent of a litter layer. A litter layer is crucial to establish a stable community of detritivores that consume biofilms and accumulated VSS. A litter layer may take several growing seasons to establish if formed solely by accumulation of plant detritus.

7. Deep penetration of plant roots into periodically aerated media favor growth of actinomycetes and fungi. These organisms produce a broad range of enzymes capable of breaking down recalcitrant organic particulates, thereby retarding solids accumulation.

Resistance to Clogging of Marsh Cells

As previously described, clogging or excessive headloss of wetland cells is a serious problem in wetland design. By a variety of mechanisms (some mechanical) described herein, the present treatment systems are resistant to clogging. The mechanisms include:

1. Flood and drain of marsh cells combined with process recycle promote endogenous respiration of marsh bed biofilms and accumulated VSS both in drained and flooded state conditions by exposure of biofilms to atmospheric oxygen in the drained state and exposure of biofilms to bulk water essentially free of labile carbon but with significant nitrate concentrations.

2. Lagoons intercept and settle inorganic fines that would clog marsh cells.

3. Vertical flow in marsh cells provides a flow path for inorganic fines to migrate out of the media beds.

4. Step feed into lagoons significantly reduces BOD loading of marsh cells; therefore, less bacteria biomass is generated in marsh media.

5. Ecological design of lagoons and marsh optimizes grazer communities to consume bacterial and algal biomass. Consumption of biomass includes the full range of biological particles produced in lagoon and marsh cells, and includes biofilms and other accumulated biomass.

6. Consumption of biomass by grazing communities effectively eliminates bacterial yield, thereby preventing accumulation of biomass that would otherwise clog the marsh media bed.

7. Aeration of marsh media by tidal flux of water in marsh cells subjects recalcitrant organic compounds to degradation by fungi and actinomycetes.

Control System

Process control is very limited in wetland wastewater treatment systems. In most cases process control is limited to level control structures. Without means of process control operators can do little to affect final effluent quality of wastewater treatment wetlands. Treatment is thus almost entirely passive.

In contrast, the present system employs pumping and aeration systems that can effectively be commanded by a programmable logic controller. The option for passive treatment remains, but the operator can optimize final effluent quality though a menu of options to manipulate pumping and aeration systems.

The present system can be operated exclusively with a series of level sensors and a programmable logic controller. Alternatively, a supervisory control and data acquisition (SCADA) controller can be coupled with sensor instrumentation including, but not limited to, dissolved oxygen, oxidation reduction potential, turbidity, influent flow, ammonia, and nitrate, depending on system requirements. Control algorithms in the SCADA controller allow the system to automatically respond to variations in loading and flow or system upsets. Automatic control responses include, but are not limited to, frequency of marsh drain and fill cycles, aeration of lagoons, and passive forward flow.

In conclusion, the wastewater treatment system is believed to represent a significant advancement of marsh treatment technology, having a plurality of unique design features. Alternating lagoons and marsh cells in series experience tidal fluctuations that greatly increase treatment rates by nitration and semipassive aeration. Endogenous respiration is essential to maintaining a high hydraulic conductivity within marsh cells and is stimulated by both draining cells and process recycle. Ecological design of plant and grazer communities is integral to system design in to a degree not currently found in wastewater engineering. The system can treat wastewater to advanced tertiary standards on footprints one-quarter to one-half the size of conventional treatment wetlands.

References

1. USEPA. September 2000. Constructed Wetland Treatment for Municipal Wastewaters. EPA/625/R-99/010.
2. Seidel, K. 1978. Gewässerreinigung durch höhere Pflanzen. *Zietshrift Garten und Landschaft* H1, 9–17; von Felde, K. and Kunst, S. 1997. N- and COD-removal in vertical flow wetlands. *Wat. Sci. Tech.* 35(5), 79–85.
3. Crites, Ron. Tchobanoglous, George. 1998. *Small and Decentralized Wastewater Treatment Systems*. Chapter 9. McGraw Hill.; Nguyen, L. M. 2000. *Organic Matter Composition, Microbial Biomass and Microbial Activity in Gravel-Bed Constructed Wetlands Treating Farm Diary Wastewaters*. Ecological Engineering 16, pp. 199–221.
4. Watson, J. Danzig, A. 1993. Pilot-Scale Nitrification Studies Using Vertical-Flow and Shallow Horizontal- Flow Constructed Wetland Cells, in *Constructed Wetland for Water Quality Improvement*. G. Morshiri, Ed., pp. 301–313. Lewis Publishers.

5. Hatano, K. Trettin, C. House, H. Wollum, G. 1993. Microbial Populations and Decomposition in Three Subsurface Flow Constructed Wetlands, in *Constructed Wetland for Water Quality Improvement*, ibid., pp. 541–548; Decamp, O. Warren, A. Sanchez, R. 1999. The Role of Ciliated Protozoa in Subsurface Flow Wetlands and Their Potential as Bioindicators. *Wat Sci. Tech.* 40(3), 91–98.

6. Meyer, J. 1999. *Performance Guide to the Vascular Plants of the Living Machine™—South Burlington, Vt*. Unpublished report to the Massachusetts Foundation for Excellence in Marine and Polymer Science. Boston, Mass. under U.S. EPA grant CX 8220496-01-0.

7. Potter, C. Karathanasis, A. 1993. Vegetation Effects on the Performance of Constructed Wetlands Treating Domestic Wastewater, in On-Site Wastewater Treatment, Proceedings of the Ninth National Symposium on Individual and Small Community Sewage Systems. pp. 663–73. Amer. Soc. of Ag. Engineers. St. Joseph, Mich.

8. Brix, H. 1997. Do Macrophytes Play a Role in Construed Treatment Wetlands? *Wat Sci. Tech.* 35(5), pp. 11–19.

9. Cooper, P. F. (Ed.). 1990. *European Design and Operations Guidelines for Reed Beds Treatment Systems*. Prepared by the European Community/European Water Pollution Control Association Expert Contact Group on Emergent Hydrophyte Treatment Systems, December 1990, (WRc Report UI 17).

10. Platzer, C. Mauch, K. 1997. Soil Clogging in Vertical Flow Reed Beds—Mechanisms, Parameters, Consequences and . . . Solutions? *Wat. Sci. Tech.* 33(5), 175–81.

11. Cooper, P. 1999. A Review of the Design and Performance of Vertical-Flow and Hybrid Reed Bed Treatment Systems. *Wat. Sci. Tech.* 40(3), 1–9.

12. Biftmann, M. Seidel, K. 1967. Entwätsserung und Aufberietung von Chemieschlamm mit Hilfe von Pflanzen. *GWF (Wasser und Abwasser)*108, 488–91.

13. Sun, G. Gray, K. R. Biddlestone, A. J. Cooper, D. J. 1999. Treatment of Agricultural Wastewater in a Combined Tidal Flow-Downflow Reed Bed System. *Wat. Sci. Tech.* 40(3), pp. 139–46.

14. Kadlec, R. H. Burgoon, P. S. Henderson, M. E. 1997. Integrated Natural Systems for Treating Potato Processing Wastewater. *Wat. Sci. Tech.* 33(5), 263–70.

15. Kantawanichkul, S. Pilaila, S., Tnapiyawnaich, Tikampornpittaya, W., and Kamkrua, S. 1999. Wastewater Treatment by Tropical Plants in Vertical-Flow Constructed Wetlands. *Wat. Sci. Tech.* 40(5), 173–78, 1999.

16. Perfler, R., Laber, J., Langergraber, and G., Haberl, R. 1999. Constructed Wetland For Rehabilitation and Reuse of Surface Waters in Tropical and Subtropical Areas—First Results from Small-Scale Plots Using Vertical Flow Beds. *Wat. Sci. Tech.* 40(3), 155–62, 1999.

17. Tchobanoglous, George; Maiski, Frank; Thompson, Ken; Chadwick, Tomas. 1989. Evolution and Performance of City of San Diego Pilot-scale Aquatic Wastewater Treatment System Using Water Hyacinths. Research Journal *Water Pollution Control Federation*, November/December 1989.

18. Odum, H. 1989. Ecological Engineering and Self Organization, in *Ecological Engineering, an Introduction to Ecotechnology*. Mitsch, W. and Jorgensen, S., Eds. Wiley-Interscience.

19. Thiess, J., K. Zielinski, and H. Lang. 1990. Biomanipulation by introduction of herbivorous zooplankton. A helpful shock for eutrophic lakes? *Hydrobiologia* 200/201.

20. Doyle, M. 1998. *Toxins from Algae/Cyanobacteria*. http://www.wisc.edu/fri/briefs/algtoxin.htm. Food Research Institute, UW-Madison.

21. Harris, G. 1986. *Phytoplankton Ecology: Structure, Function and Fluctuation*. Chapman and Hall, Ltd. London.

22. Reeders H, H., B. V. Abraham, and R. Noordhuis. 1993. Potential of the Zebra mussel for water quality management. In, *Zebra mussels: biology, impacts and control*. T. Nalepa, D. Schloesser, Eds., Lewis publishers; Sagi, G. 1992. The effect of filter feeding fish on water quality in irrigation reservoirs. *Agricultural water management* 22: 369–78; Shapiro, J., B., Forsberg, V. Lamarra, M. Lynch, E. Smltzer, and G. Zoto. 1982. *Experiments and experiences in biomanipulation: studies of biological ways to reduce algal abundance and eliminate blue-greens*. Limnological Research Center, Interim Report No. 19. University of Minnesota, Minneapolis; Shapiro, J., B. Forsberg, V. Lamarra, M. Lynch, E. Smltzer, and G. Zoto. 1982. *Experiments and experiences in biomanipulation: Studies of biological ways to reduce algal abundance and eliminate blue-greens*. Limnological Research Center, Interim Report No. 19. University of Minnesota, Minneapolis; Smith, D. W. 1993. Wastewater treatment with complementary filter feeders: a new method to control excessive suspended solids and nutrients in stabilization ponds. *Water environment research* 65(5).

23. Mitsch, W. and Gosselink, J. 1986. Hydrology of Wetlands, Chapter 4 in *Wetlands*. Van Nostrand Reinhold, New York.

24. As can be determined from the long term persistence design hydraulic conductivity in recirculating sand and gravel filters (see Chapter 11 in Crites and Tchobanoglous, *Small and Decentralized Wastewater Management Systems*).

25. Mortensen, C. 2001. President of Utelite Corporation. Coalville, Utah. Personal Communication.

26. Mitsch, W. and Gosselink, J. 1986. Tidal Freshwater Marshes, Chapter 9 in *Wetlands*. Van Nostrand Reinhold, New York.

27. Elser, J., H. Carny, and C. Goldman. 1990. The zooplankton-phytoplankton interface in lakes of contrasting trophic status: an experimental comparison. *Hydrobiologia* 200/201: August.

28. Smith, D. W. 1989. The feeding selectivity of silver carp, *Hypophthalmichthys molitrix* val. *J. Fish biology* (G.B.) 34: 819.

29. Green, M., Freidler, E., Ruskol, Y., and Safrai, I. 1997. Investigation of Alternative Method for Nitrification in Constructed Wetlands. *Wat Sci. Tech.* 35(5), pp. 63–70; Revitt, D. M., Shutes, R. B. E., Llewwllyn, N. R. and Worral, P. 1997. Experimental Reedbed Systems for the Treatment of Airport Runoff. *Wat Sci. Tech.* 36(8–9), 385–90.

30. Metcalf and Eddy. 1991. Chapter 5. Tchobanoglous, G., Burton, F., Eds. McGraw-Hill.

31. Reed, Sherwood. Crites, Ron. Middlebrooks, E. 1995. *Natural Systems for Waste Management and Treatment*, $2^{nd}$ Ed. Chapt. 5. McGraw-Hill.

32. Tanner, C., et al. 1999. *Ecological Engineering* 12, 67–92.

33. Sun, G., et al. 1999. *Water Sci. Tech.* 40(3), 139–46.

34. Jorgensen, C. B. 1989. Water processing in ciliary feeders, with special reference to the bivalve filter pump. Comparative Biochemical Physiology 94*a* no. 2: 383–394.
35. Taylor. W., and R. Saunders. 1991. Protozoa, Chapter 3. In, Ecology and Classification of North American Freshwater Invertebrates. J H. Thorp and A. P. Covich, Eds. San Diego: Academic Press, Inc.
36. Wallace, R., and T. Snell. 1991. Rotifera, Chapter 8. In, Ecology and Classification of North American Freshwater Invertebrates. J H. Thorp and A. P. Covich, Eds. San Diego: Academic Press.
37. Williamson, C. 1991. Copepoda. Chapter 21 in Ecology and Classification of North American Freshwater Invertebrates. Thorp, James. and Covich, Alan. Eds.
38. Dodson, S., and D. Frey. 1991. Cladocera and other branchiopods, Chapter 20. In, Ecology and Classification of North American Freshwater Invertebrates. J H. Thorp and A. P. Covich, Eds. San Diego: Academic Press, Inc.
39. Food particle size class estimated from organism size class and habitat information in Delorme, L. 1991. Ostracoda, Chapter 19. In, Ecology and Classification of North American Freshwater Invertebrates. J H. Thorp and A. P. Covich, Eds. San Diego: Academic Press, Inc.
40. Food particle size class estimated from organism size class and habitat information in Poinar, G. E. Jr. 1991. Nematoda and Nemataomorpha, Chapter 9. In, Ecology and Classification of North American Freshwater Invertebrates. J H. Thorp and A. P. Covich, Eds. San Diego: Academic Press, Inc.
41. McMahon, R. 1993. Mollusca: Bivalvia, Chapter 11. In Ecology and Classification of North American Freshwater Invertebrates. J H. Thorp and A. P. Covich, Eds. San Diego: Academic Press.

What is claimed is:

1. A wastewater treatment system comprising:
   a first and a second substantially aerobic lagoon, each adapted to contain aquatic plants;
   a first and a second marsh cell, each adapted to contain particulate media and plants so that the plants can grow on a surface of the media, so that roots of the plants can grow to extend into the media;
   means for transporting wastewater to be treated to the first lagoon, from the first lagoon after a first time period of retention within the first lagoon to the first marsh cell, from the first marsh cell to the second lagoon, and from the second lagoon after a second time period of retention within the second lagoon to the second marsh cell.
2. The system recited in claim 1, further comprising means for channeling a portion of water emerging from a bottom of the second marsh cell to the first lagoon, for achieving process recycle.
3. The system recited in claim 2, wherein the channeling means comprises a pump station positioned to receive water exiting the second marsh cell, the pump station comprising a basin and a pump in fluid communication.
4. The system recited in claim 1, wherein the water-transporting means from the first marsh cell to the second lagoon comprises gravity feed, thereby effecting passive forward flow.
5. The system recited in claim 4, wherein a bottom of the first marsh cell is higher than a bottom of the second lagoon.
6. The system recited in claim 5, wherein the second lagoon has a bottom portion having a top surface level defined by a height of a bottom of the first marsh cell, the bottom portion having a volume sufficiently large to contain water sufficient to substantially drain the first marsh cell via gravity feed.
7. The system recited in claim 6, wherein the second period of retention is sufficient to permit aeration of the plant roots and the media in the first marsh cell.
8. The system recited in claim 1, wherein the means for transporting wastewater to be treated to the first lagoon further comprises means for dividing the water to be treated into two flow paths, a first flow path leading to the first lagoon and a second flow path leading to the second lagoon.
9. The system recited in claim 1, wherein the transporting means all function to channel water from adjacent a bottom of the first and the second lagoons and the first and the second marsh cells, to a surface of the first and the second marsh cells and to a locations in spaced relation from a bottom of the first and the second lagoons, respectively.
10. The system recited in claim 1, wherein the first and the second marsh cells are positioned to receive overflow from the first and the second lagoon, respectively, if an overflow occurs.
11. The system recited in claim 1, wherein the means for transporting water from the second marsh cell outlet to the first lagoon inlet is adapted to recycle a water portion in a range of 50 to 1000% of a volume of incoming wastewater entering the system per unit time.
12. A method for treating wastewater comprising the steps of:
    subjecting wastewater to be treated to a first substantially aerobic environment for a first time period;
    transporting water from the first aerobic environment to a surface of a first substantially aerobic/anoxic environment containing plants having roots for a second time period;
    transporting water emerging from beneath the plant roots of the first aerobic/anoxic environment to a second substantially aerobic environment for a third time period;
    transporting water from the second aerobic environment to a surface of a second substantially aerobic/anoxic environment containing plants having roots for a fourth time period; and
    recycling at least a portion of the water emerging from beneath the plant roots of the second aerobic/anoxic environment to the first substantially aerobic environment.
13. A method of treating wastewater comprising the steps of:
    transporting wastewater to be treated to the first substantially aerobic lagoon containing aquatic plants;
    transporting water from the first lagoon after a first time period of retention within the first lagoon to a first marsh cell containing particulate media and plants growing on a top surface of the media, so that roots of the plants can grow to extend into the media;
    transporting water from the first marsh cell to a second substantially aerobic second lagoon; and
    transporting water from the second lagoon after a second time period of retention within the second lagoon to a second marsh cell containing particulate media and plants growing on a top surface of the media, so that roots of the plants can grow to extend into the media.
14. The method recited in claim 13, further comprising the step of channeling a portion of water emerging from a bottom of the second marsh cell to the first lagoon, for achieving process recycle.

15. The method recited in claim 14, wherein the channeling step comprises transferring water exiting the second marsh cell to a pump station, and pumping water from the pump station to the first lagoon.

16. The method recited in claim 13, wherein the water-transporting step from the first marsh cell to the second lagoon comprises permitting gravity feed, thereby effecting passive forward flow.

17. The method recited in claim 16, wherein a bottom of the first marsh cell is higher than a bottom of the second lagoon.

18. The method recited in claim 17, wherein the second lagoon has a bottom portion having a top surface level defined by a height of a bottom of the first marsh cell, the bottom portion having a volume sufficiently large to contain water sufficient to substantially drain the first marsh cell via gravity feed.

19. The method recited in claim 18, wherein the second period of retention is sufficient to permit aeration of the plant roots and the media in the first marsh cell.

20. The method recited in claim 13, wherein the step of transporting wastewater to be treated to the first lagoon further comprises dividing the water to be treated into two flow paths, a first flow path leading to the first lagoon and a second flow path leading to the second lagoon.

21. The method recited in claim 13, wherein the transporting steps all function to channel water from adjacent a bottom of the first and the second lagoons and the first and the second marsh cells, to a surface of the first and the second marsh cells and to a locations in spaced relation from a bottom of the first and the second lagoons, respectively.

22. The method recited in claim 13, wherein the first and the second marsh cells are positioned to receive overflow from the first and the second lagoon, respectively, if an overflow occurs.

23. The method recited in claim 13, wherein the step of transporting water from the second marsh cell outlet to the first lagoon inlet achieves a recycling of a water portion in a range of 50 to 1000% of a volume of incoming wastewater entering the system per unit time.

* * * * *